US011841108B2

(12) United States Patent
Steere et al.

(10) Patent No.: US 11,841,108 B2
(45) Date of Patent: Dec. 12, 2023

(54) MULTI-LEGGED EQUIPMENT SUPPORT HAVING LEG ANGLE ADJUSTMENT

(71) Applicant: AOB Products Company, Columbia, MO (US)

(72) Inventors: Brian Steere, Columbia, MO (US); Michael Cottrell, Ashland, MO (US); Timothy S. Kinney, Warrenton, MO (US); James Tayon, Moberly, MO (US); Jason Nickerson, Columbia, MO (US); Justin Burke, Columbia, MO (US); Anthony Vesich, Columbia, MO (US); Dennis W. Cauley, Jr., Fayette, MO (US); Mark Dalton, Columbia, MO (US); Kyle Smith, Columbia, MO (US)

(73) Assignee: AOB Products Company, Columbia, MO (US)

( * ) Notice: Subject to any disclaimer, the term of this patent is extended or adjusted under 35 U.S.C. 154(b) by 136 days.

(21) Appl. No.: 17/124,560

(22) Filed: Dec. 17, 2020

(65) Prior Publication Data
US 2021/0180742 A1 Jun. 17, 2021

Related U.S. Application Data

(60) Provisional application No. 62/948,946, filed on Dec. 17, 2019.

(51) Int. Cl.
*F16M 11/16* (2006.01)
*F16M 11/34* (2006.01)

(52) U.S. Cl.
CPC ............. *F16M 11/16* (2013.01); *F16M 11/34* (2013.01)

(58) Field of Classification Search
CPC ................................ F16M 11/16; F16M 11/34
See application file for complete search history.

(56) References Cited

U.S. PATENT DOCUMENTS

| 197,397 | A | 11/1877 | O'Neil |
| 387,411 | A | 8/1888 | Gisel |

(Continued)

FOREIGN PATENT DOCUMENTS

| DE | 838872 | 5/1952 |
| EP | 0624455 | 11/1994 |

(Continued)

OTHER PUBLICATIONS

Joe's, "Shooter's Ridge Steady Point Shooting Rest," http://www.joessports.com/product/index.jsp?productId=3155005&cp=726872&parentPag . . . , Item No. 3155005, 1 pg. [Internet accessed Jul. 17, 2008].

(Continued)

*Primary Examiner* — Eret C McNichols
(74) *Attorney, Agent, or Firm* — Stinson LLP

(57) ABSTRACT

A multi-legged equipment support, components thereof, and associated methods. The equipment support comprises a stand and an equipment holder. The stand includes a hub and multiple legs pivotable with respect to the hub. The legs are pivotable outward from stowed positions to preset operational pivoted positions. The user can select a preset operational pivoted position in which outward pivoting of a leg will stop based on moving an actuator between preset locations.

24 Claims, 7 Drawing Sheets

(56) References Cited

U.S. PATENT DOCUMENTS

| | | |
|---|---|---|
| 399,604 A | 3/1889 | Dufner et al. |
| 407,418 A | 7/1889 | Schneider |
| 499,315 A | 6/1893 | Borchardt |
| 568,543 A | 9/1896 | Parks |
| 668,219 A | 2/1901 | Rock |
| 691,912 A | 1/1902 | McClean |
| 718,865 A | 1/1903 | Northcraft |
| 778,865 A | 1/1905 | Hyenga |
| 789,909 A | 5/1905 | Herold |
| 1,033,624 A | 7/1912 | Schmeisser |
| 1,061,577 A | 5/1913 | Whitney |
| 1,088,362 A | 2/1914 | Perkins |
| 1,089,307 A | 3/1914 | Benet et al. |
| 1,121,945 A | 12/1914 | Smith |
| 1,145,585 A | 7/1915 | Hebard |
| 1,175,692 A | 3/1916 | Boicourt |
| 1,187,325 A | 6/1916 | Ivey |
| 1,195,777 A | 8/1916 | Burtin |
| 1,250,215 A | 12/1917 | Panos |
| 1,256,255 A | 2/1918 | Porter |
| 1,295,688 A | 2/1919 | Butler |
| 1,367,353 A | 2/1921 | Craig |
| 1,499,748 A | 5/1922 | Papouchis |
| 1,457,407 A | 6/1923 | Stokes |
| 1,488,647 A | 4/1924 | Quinn |
| 1,491,604 A | 4/1924 | Fuller |
| 1,639,722 A | 8/1927 | Whitney |
| 1,693,289 A | 11/1928 | Warren |
| 1,736,244 A | 11/1929 | Baker |
| 1,902,040 A | 3/1933 | Meyer |
| 1,907,181 A | 5/1933 | Fey |
| 1,927,876 A | 9/1933 | Meyer |
| 1,928,871 A | 10/1933 | Swebilius |
| 2,066,218 A | 12/1936 | Morgan |
| 2,079,510 A | 5/1937 | King et al. |
| 2,090,930 A | 8/1937 | Chubb |
| 2,100,514 A | 11/1937 | Miller |
| 2,121,982 A | 6/1938 | Pugsley |
| 2,125,353 A | 8/1938 | Mattson |
| 2,216,766 A | 10/1940 | Cook |
| 2,232,743 A | 2/1941 | Swenson |
| 2,297,993 A | 10/1942 | Tratsch |
| 2,331,372 A | 10/1943 | Buchanan |
| 2,427,365 A | 3/1944 | Meister |
| 2,378,545 A | 6/1945 | Fraser et al. |
| D147,305 S | 8/1947 | Sloan |
| 2,432,519 A | 12/1947 | Garand |
| 2,451,266 A | 10/1948 | Whittemore |
| 2,455,644 A | 12/1948 | Barnes |
| 2,476,078 A | 7/1949 | Banks |
| 2,479,354 A | 8/1949 | Hanson |
| 2,483,089 A | 9/1949 | Ferguson |
| 2,484,801 A | 10/1949 | Anderson |
| 2,508,951 A | 5/1950 | Kazimier |
| 2,510,380 A | 6/1950 | Clifford |
| 2,517,268 A | 8/1950 | Wilson |
| 2,582,140 A | 1/1952 | Leek |
| 2,638,676 A | 5/1953 | Callahan |
| 2,677,207 A | 5/1954 | Stewart |
| 2,701,930 A | 2/1955 | Dolan |
| 2,729,975 A | 1/1956 | Hawthornet et al. |
| 2,731,829 A | 1/1956 | Wigington et al. |
| 2,740,530 A | 4/1956 | Ponder |
| 2,753,642 A | 7/1956 | Sullivan |
| 2,774,090 A | 12/1956 | Allinson |
| 2,774,563 A | 12/1956 | Pribis |
| 2,795,881 A | 6/1957 | Bellows |
| 2,813,376 A | 11/1957 | Middlemark |
| 2,817,233 A | 12/1957 | Dower et al. |
| 2,821,117 A | 1/1958 | Hultgren |
| 2,847,909 A | 8/1958 | Kester |
| 2,867,931 A | 1/1959 | Schreiber |
| 2,874,707 A | 2/1959 | Koppel |
| 2,877,689 A | 3/1959 | Pribis |
| 2,894,347 A | 7/1959 | Woodcock |
| 3,064,976 A | 11/1959 | Kuhn |
| 2,924,881 A | 2/1960 | Gee |
| 2,924,904 A | 2/1960 | Amsler |
| 2,924,914 A | 2/1960 | Garwood |
| 2,975,540 A | 3/1961 | Lewis |
| 2,999,788 A | 9/1961 | Morgan |
| 3,011,283 A | 12/1961 | Lunn et al. |
| 3,012,350 A | 12/1961 | Wold |
| 3,013,289 A | 12/1961 | Sasena |
| 3,023,527 A | 3/1962 | Leek et al. |
| 3,024,653 A | 3/1962 | Broadway |
| 3,041,938 A | 7/1962 | Seabrook |
| 3,055,655 A | 9/1962 | Chelf |
| 3,060,612 A | 10/1962 | Brown et al. |
| 3,107,642 A | 10/1963 | Lakin |
| 3,112,567 A | 12/1963 | Flanagan |
| 3,125,929 A | 3/1964 | Peasley |
| 3,128,668 A | 4/1964 | Dicken |
| 3,137,957 A | 6/1964 | Ingalls |
| 3,163,420 A | 12/1964 | Braun |
| 3,175,456 A | 3/1965 | Goodsell |
| 3,183,617 A | 5/1965 | Ruger et al. |
| 3,205,518 A | 9/1965 | Romaine |
| 3,206,885 A | 9/1965 | Dye |
| 3,225,656 A | 12/1965 | Flaherty et al. |
| D203,680 S | 2/1966 | Allison |
| 3,240,103 A | 3/1966 | Lamont |
| 3,259,986 A | 7/1966 | Carr |
| 3,283,425 A | 11/1966 | Boyd |
| 3,283,643 A | 11/1966 | Mittelsteadt |
| 3,291,317 A | 12/1966 | Bowen |
| 3,292,293 A | 12/1966 | Chiasera et al. |
| 3,320,848 A | 5/1967 | Ponsness |
| 3,323,246 A | 6/1967 | Loffler |
| 3,327,422 A | 6/1967 | Harris |
| 3,330,561 A | 7/1967 | Kandel |
| 3,343,411 A | 9/1967 | Lee |
| 3,353,827 A | 11/1967 | Dun, Jr. |
| 3,370,852 A | 2/1968 | Kandel |
| 3,406,969 A | 10/1968 | Tisdell et al. |
| 3,423,092 A | 1/1969 | Kandel |
| D215,311 S | 9/1969 | Born |
| 3,473,673 A | 10/1969 | Porter |
| 3,486,752 A | 12/1969 | Colvin |
| 3,499,525 A | 3/1970 | Kanter |
| 3,510,951 A | 5/1970 | Dow |
| 3,513,604 A | 5/1970 | Matsunaga et al. |
| 3,536,160 A | 10/1970 | Brewer |
| 3,550,941 A | 12/1970 | Spiro et al. |
| 3,556,666 A | 1/1971 | Lichenstern |
| D220,154 S | 3/1971 | Irelan |
| 3,572,712 A | 3/1971 | Vick |
| 3,580,127 A | 5/1971 | Lee |
| 3,583,556 A | 6/1971 | Wagner |
| 3,584,820 A | 6/1971 | Butcher, Sr. |
| 3,587,193 A | 6/1971 | Lewis |
| 3,608,225 A | 9/1971 | Manuel |
| 3,609,902 A | 10/1971 | Casull |
| 3,646,704 A | 3/1972 | Ellsworth |
| 3,648,909 A | 3/1972 | Wisecarver |
| 3,680,266 A | 8/1972 | Shiplov |
| 3,680,354 A | 8/1972 | Phillips, Jr. |
| 3,711,955 A | 1/1973 | Holt |
| 3,711,984 A | 1/1973 | Dyer et al. |
| 3,736,243 A | 5/1973 | Duggan |
| 3,738,101 A | 6/1973 | Simon-Vermot |
| 3,739,515 A | 6/1973 | Koon, Jr. |
| 3,743,088 A | 7/1973 | Henkin |
| 3,744,292 A | 7/1973 | Michelson |
| 3,745,875 A | 7/1973 | Kennedy et al. |
| 3,748,950 A | 7/1973 | Huntington |
| 3,764,219 A | 10/1973 | Collins |
| 3,769,758 A | 11/1973 | McDonald |
| 3,771,176 A | 11/1973 | Herman, Sr. |
| 3,804,238 A | 4/1974 | Howard |
| 3,813,816 A | 6/1974 | Funk |
| 3,815,270 A | 6/1974 | Pachmayr |
| 3,826,559 A | 7/1974 | Berliner et al. |
| 3,827,172 A | 8/1974 | Howe |

(56) References Cited

U.S. PATENT DOCUMENTS

| | | |
|---|---|---|
| 3,842,527 A | 10/1974 | Low |
| D233,853 S | 12/1974 | Ferrara |
| 3,876,078 A | 4/1975 | Gomes et al. |
| 3,877,178 A | 4/1975 | Campanelli |
| 3,878,939 A | 4/1975 | Wilcox |
| 3,885,357 A | 5/1975 | Hoyt |
| 3,893,266 A | 7/1975 | Anderson et al. |
| 3,895,803 A | 7/1975 | Loe |
| 3,899,175 A | 8/1975 | Loe |
| 3,899,797 A | 8/1975 | Gunst |
| D237,106 S | 10/1975 | Baljet et al. |
| 3,913,746 A | 10/1975 | Burton |
| 3,914,879 A | 10/1975 | Taylor, III et al. |
| 3,935,657 A | 2/1976 | Wade |
| 3,947,988 A | 4/1976 | Besaw |
| 3,949,987 A | 4/1976 | Candor |
| 3,961,436 A | 6/1976 | Hagen et al. |
| 3,964,613 A | 6/1976 | Anderson, Jr. |
| 3,979,849 A | 9/1976 | Haskins |
| 3,358,504 A | 12/1976 | Freebairn |
| 4,007,554 A | 2/1977 | Helmstadter |
| 4,012,860 A | 3/1977 | Auger |
| 4,018,339 A | 4/1977 | Pritz |
| 4,021,971 A | 5/1977 | McFadden |
| 4,026,057 A | 5/1977 | Cady |
| 4,027,781 A | 6/1977 | Covert |
| 4,042,242 A | 8/1977 | Nicholls et al. |
| 4,054,288 A | 10/1977 | Perrine, Sr. |
| 4,055,016 A | 10/1977 | Katsenes |
| 4,072,313 A | 2/1978 | Murso et al. |
| 4,076,247 A | 2/1978 | Kim et al. |
| 4,090,606 A | 5/1978 | Dawson |
| 4,120,108 A | 10/1978 | Vickers et al. |
| 4,120,276 A | 10/1978 | Curran |
| 4,122,623 A | 10/1978 | Stice |
| 4,143,491 A | 3/1979 | Blanc |
| 4,177,608 A | 12/1979 | Balz |
| 4,188,855 A | 2/1980 | Alberts |
| 4,203,600 A | 5/1980 | Brown |
| 4,206,573 A | 6/1980 | Hayward |
| 4,207,699 A | 6/1980 | Hensley |
| 4,222,305 A | 9/1980 | Lee |
| 4,223,588 A | 9/1980 | Simpson |
| 4,233,748 A | 11/1980 | Ford et al. |
| D257,687 S | 12/1980 | Bechtel |
| 4,265,045 A | 5/1981 | Garbini |
| 4,266,748 A | 5/1981 | Dalton |
| 4,266,780 A | 5/1981 | McQuary |
| 4,282,671 A | 8/1981 | Wood et al. |
| D260,650 S | 9/1981 | Alviti |
| D261,794 S | 11/1981 | Bechtel |
| 4,301,625 A | 11/1981 | Rampe |
| 4,312,146 A | 1/1982 | Koon, Jr. et al. |
| 4,317,552 A * | 3/1982 | Weidler ............ F16M 13/00 248/168 |
| 4,332,185 A | 6/1982 | Hargrove |
| 4,333,385 A | 6/1982 | Culver |
| 4,338,726 A | 7/1982 | Swailes |
| 4,340,370 A | 7/1982 | Marshall et al. |
| 4,345,398 A | 8/1982 | Pickett |
| 4,346,530 A | 8/1982 | Stewart et al. |
| 4,359,833 A | 11/1982 | Pachmayr et al. |
| 4,361,989 A | 12/1982 | Ohno |
| 4,385,464 A | 5/1983 | Casull |
| 4,385,545 A | 5/1983 | Duer |
| 4,391,058 A | 7/1983 | Casull |
| 4,392,321 A | 7/1983 | Bosworth |
| 4,407,379 A | 10/1983 | Pryor et al. |
| 4,409,751 A | 10/1983 | Goda et al. |
| 4,409,826 A | 10/1983 | Wenger |
| 4,426,085 A | 1/1984 | Dixon |
| 4,438,913 A | 3/1984 | Hylla |
| 4,446,900 A | 5/1984 | Markovich |
| 4,449,314 A | 5/1984 | Sorensen |
| 4,462,598 A | 7/1984 | Chalin et al. |
| 4,477,082 A | 10/1984 | McKenzie et al. |
| 4,480,411 A | 11/1984 | Blaz et al. |
| 4,501,071 A | 2/1985 | Manske |
| 4,506,466 A | 3/1985 | Hall |
| 4,508,508 A | 4/1985 | Theodore |
| 4,512,101 A | 4/1985 | Waterman, Jr. |
| 4,522,102 A | 6/1985 | Pickens |
| 4,526,084 A | 7/1985 | David et al. |
| 4,540,182 A | 9/1985 | Clement |
| 4,542,677 A | 9/1985 | Lee |
| 4,548,392 A | 10/1985 | Rickling |
| 4,558,531 A | 12/1985 | Kilby |
| D283,561 S | 4/1986 | Geist et al. |
| 4,601,124 A | 7/1986 | Brown, Jr. |
| 4,607,561 A * | 8/1986 | Frimer ................ F41A 23/08 89/37.04 |
| 4,608,762 A | 9/1986 | Varner |
| 4,621,563 A | 11/1986 | Poiencot |
| 4,625,620 A | 12/1986 | Harris |
| 4,632,008 A | 12/1986 | Homer |
| 4,644,987 A | 2/1987 | Kiang et al. |
| 4,648,191 A | 3/1987 | Goff et al. |
| 4,653,210 A | 3/1987 | Poff, Jr. |
| 4,671,364 A | 6/1987 | Fink et al. |
| 4,674,216 A | 6/1987 | Ruger et al. |
| 4,695,060 A | 9/1987 | Pilgrim |
| 4,696,356 A | 9/1987 | Ellion et al. |
| 4,702,029 A | 10/1987 | Shaine |
| 4,715,476 A | 12/1987 | France |
| 4,715,499 A | 12/1987 | Franklin |
| 4,716,673 A | 1/1988 | Williams et al. |
| 4,721,205 A | 1/1988 | Burt et al. |
| 4,723,472 A | 2/1988 | Lee |
| 4,729,186 A | 3/1988 | Rieger |
| 4,732,394 A | 3/1988 | Stein et al. |
| 4,736,843 A | 4/1988 | Leonard |
| 4,739,996 A | 4/1988 | Vedder |
| 4,751,963 A | 6/1988 | Bui et al. |
| D297,855 S | 9/1988 | Ruger et al. |
| 4,776,471 A | 10/1988 | Elkins |
| 4,790,079 A | 12/1988 | Meyers |
| 4,790,096 A | 12/1988 | Gibson et al. |
| 4,799,324 A | 1/1989 | Nodo |
| 4,807,381 A | 2/1989 | Southard |
| 4,807,888 A | 2/1989 | Pidde et al. |
| 4,815,593 A | 3/1989 | Brown |
| 4,819,359 A | 4/1989 | Bassett |
| 4,821,256 A | 4/1989 | Schmidt |
| 4,821,422 A | 4/1989 | Porter |
| 4,821,443 A | 4/1989 | Bianco et al. |
| 4,823,673 A | 4/1989 | Downing |
| 4,824,086 A | 4/1989 | Rickling et al. |
| 4,841,839 A | 6/1989 | Stuart |
| 4,850,151 A | 7/1989 | Ditscherlein |
| 4,854,066 A | 8/1989 | Canterbury, Sr. |
| 4,862,567 A | 9/1989 | Beebe |
| D304,223 S | 10/1989 | Ruger et al. |
| 4,873,777 A | 10/1989 | Southard |
| 4,877,131 A | 10/1989 | Patros et al. |
| 4,890,406 A | 1/1990 | French |
| 4,890,847 A | 1/1990 | Cartee et al. |
| 4,896,446 A | 1/1990 | Gregory |
| D306,234 S | 2/1990 | Ferstl et al. |
| 4,903,425 A | 2/1990 | Harris |
| 4,910,904 A | 3/1990 | Rose |
| 4,918,825 A | 4/1990 | Lesh et al. |
| 4,923,402 A | 5/1990 | Marshall et al. |
| 4,924,616 A | 5/1990 | Bell |
| 4,937,965 A | 7/1990 | Narvaez |
| D310,302 S | 9/1990 | Southard |
| 4,967,497 A | 11/1990 | Yakscoe |
| 4,971,208 A | 11/1990 | Reinfried, Jr. et al. |
| 4,972,619 A | 11/1990 | Eckert |
| 4,979,752 A | 12/1990 | Fosseen |
| D313,886 S | 1/1991 | Southard |
| 4,987,694 A | 1/1991 | Ombardo |
| 4,998,367 A | 3/1991 | Teibowitz |
| 4,998,944 A | 3/1991 | Lund |
| 5,005,657 A | 4/1991 | Ellion et al. |

(56) References Cited

U.S. PATENT DOCUMENTS

| | | |
|---|---|---|
| 5,009,021 A | 4/1991 | Nelson |
| 5,014,793 A | 5/1991 | Germanton et al. |
| 5,031,348 A | 7/1991 | Carey |
| 5,050,330 A | 9/1991 | Pilgrim et al. |
| 5,058,302 A | 10/1991 | Minneman |
| 5,060,410 A | 10/1991 | Mueller |
| 5,063,679 A | 11/1991 | Schwandt |
| 5,067,268 A | 11/1991 | Ransom |
| 5,070,636 A | 12/1991 | Mueller |
| 5,074,188 A | 12/1991 | Harris |
| 5,081,783 A | 1/1992 | Jarvis |
| 5,082,222 A * | 1/1992 | Hsu .................. F16M 11/16 248/170 |
| 5,117,850 A | 6/1992 | Money |
| 5,123,194 A | 6/1992 | Mason |
| 5,125,389 A | 6/1992 | Paff |
| 5,143,340 A | 9/1992 | Wood et al. |
| 5,149,900 A | 9/1992 | Buck |
| 5,173,563 A | 12/1992 | Gray |
| 5,180,874 A | 1/1993 | Troncoso, Jr. |
| 5,185,927 A | 2/1993 | Rivers |
| 5,186,468 A | 2/1993 | Davies |
| 5,188,371 A | 2/1993 | Edwards |
| 5,194,678 A | 3/1993 | Kramer |
| D335,896 S | 5/1993 | Evenson |
| 5,211,404 A | 5/1993 | Grant |
| 5,221,806 A | 6/1993 | Chaney et al. |
| 5,222,306 A | 6/1993 | Neumann |
| 5,228,887 A | 7/1993 | Mayer et al. |
| 5,232,227 A | 8/1993 | Bateman |
| 5,233,779 A | 8/1993 | Shaw |
| 5,235,764 A | 8/1993 | Perazzi |
| 5,237,778 A | 8/1993 | Baer |
| 5,240,258 A | 8/1993 | Bateman |
| 5,247,758 A | 9/1993 | Mason |
| 5,271,175 A | 12/1993 | West, III |
| 5,275,890 A | 1/1994 | Wolf et al. |
| 5,287,643 A | 2/1994 | Arizpe-Gilmore |
| 5,311,693 A | 5/1994 | Underwood |
| 5,315,781 A | 5/1994 | Beisner |
| 5,316,579 A | 5/1994 | McMillan et al. |
| 5,320,217 A | 6/1994 | Enarz |
| 5,320,223 A | 6/1994 | Allen |
| 5,328,029 A | 7/1994 | Chow et al. |
| 5,332,185 A | 7/1994 | Walker, III |
| 5,333,404 A | 8/1994 | Lingyak |
| 5,333,829 A | 8/1994 | Bell et al. |
| 5,335,578 A | 8/1994 | Lorden et al. |
| 5,337,505 A | 8/1994 | Brown et al. |
| 5,344,012 A | 9/1994 | Matthews |
| 5,347,740 A | 9/1994 | Rather et al. |
| 5,351,428 A | 10/1994 | Graham |
| 5,354,247 A | 10/1994 | Wilkinson |
| 5,358,254 A | 10/1994 | Yeh et al. |
| 5,361,505 A | 11/1994 | Faughn |
| 5,367,232 A | 11/1994 | Netherton et al. |
| 5,370,240 A | 12/1994 | Hand |
| 5,375,377 A | 12/1994 | Kenton |
| 5,392,553 A | 2/1995 | Carey |
| 5,394,983 A | 3/1995 | Latulippe et al. |
| 5,402,595 A | 4/1995 | Tamllos |
| 5,406,733 A | 4/1995 | Tarlton et al. |
| 5,410,833 A | 5/1995 | Paterson |
| 5,414,949 A | 5/1995 | Peebles |
| D359,392 S | 6/1995 | Bellington |
| 5,421,115 A | 6/1995 | McKay |
| 5,433,010 A | 7/1995 | Bell |
| 5,433,451 A | 7/1995 | DeVries |
| 5,435,223 A | 7/1995 | Blodgett et al. |
| 5,442,860 A | 8/1995 | Palmer |
| D362,116 S | 9/1995 | Bellington et al. |
| 5,446,987 A | 9/1995 | Lee et al. |
| D364,080 S | 11/1995 | Weyrauch |
| 5,481,817 A | 1/1996 | Parker |
| 5,482,241 A | 1/1996 | Oglesby |
| 5,486,135 A | 1/1996 | Arpaio |
| 5,490,302 A | 2/1996 | Dion |
| 5,491,921 A | 2/1996 | Allen |
| 5,497,557 A | 3/1996 | Martinsson et al. |
| 5,497,575 A | 3/1996 | Fried et al. |
| D369,904 S | 5/1996 | Taylor |
| 5,501,467 A | 6/1996 | Kandel |
| 5,525,314 A | 6/1996 | Hurson |
| 5,540,329 A | 7/1996 | Vogeley |
| 5,545,855 A | 8/1996 | Stanfield et al. |
| 5,562,208 A | 10/1996 | Hasler et al. |
| D375,538 S | 11/1996 | Minneman |
| 5,570,513 A | 11/1996 | Peterson |
| 5,580,063 A | 12/1996 | Edwards |
| 5,588,242 A | 12/1996 | Hughes |
| 5,600,913 A | 2/1997 | Minneman |
| 5,617,666 A | 4/1997 | Scott |
| 5,622,344 A | 4/1997 | Gracie |
| 5,628,135 A | 5/1997 | Cady |
| D380,116 S | 6/1997 | Minneman |
| 5,640,944 A | 6/1997 | Minneman |
| 5,644,862 A | 7/1997 | Folmer |
| 5,649,465 A | 7/1997 | Beebe |
| 5,651,207 A | 7/1997 | Knight |
| 5,653,625 A | 8/1997 | Pierce et al. |
| 5,661,919 A | 9/1997 | Pryor |
| 5,662,516 A | 9/1997 | You |
| 5,666,757 A | 9/1997 | Helmstadter |
| D387,123 S | 12/1997 | Hughes et al. |
| 5,703,317 A | 12/1997 | Evilly et al. |
| 5,704,482 A | 1/1998 | Apps et al. |
| 5,711,102 A | 1/1998 | Plaster et al. |
| 5,711,103 A | 1/1998 | Keng |
| 5,715,625 A | 2/1998 | West, III |
| D391,616 S | 3/1998 | Plybon |
| 5,723,183 A | 3/1998 | Williams et al. |
| 5,723,806 A | 3/1998 | Odom |
| 5,725,096 A | 3/1998 | Winnard |
| 5,737,865 A | 4/1998 | Brandl et al. |
| 5,740,625 A | 4/1998 | Jenkins |
| 5,743,395 A | 4/1998 | Backer |
| 5,758,447 A | 6/1998 | Wenetz |
| 5,758,933 A | 6/1998 | Clendening |
| 5,761,954 A | 6/1998 | Dvorak |
| 5,778,589 A | 7/1998 | Teague |
| 5,779,527 A | 7/1998 | Maebashi |
| 5,791,499 A | 8/1998 | Zebbedies |
| 5,811,720 A | 9/1998 | Quinnell et al. |
| 5,815,974 A | 10/1998 | Keng |
| 5,833,308 A | 11/1998 | Strong, III et al. |
| D403,176 S | 12/1998 | Harper |
| 5,845,774 A | 12/1998 | Hausknecht |
| 5,857,279 A | 1/1999 | de Oliveira Masina et al. |
| 5,875,580 A | 3/1999 | Hill et al. |
| 5,878,504 A | 3/1999 | Harms |
| 5,884,966 A | 3/1999 | Hill et al. |
| 5,899,329 A | 5/1999 | Hu et al. |
| 5,907,919 A | 6/1999 | Keeney |
| 5,913,131 A | 6/1999 | Hossain et al. |
| 5,913,422 A | 6/1999 | Cote et al. |
| 5,913,667 A | 6/1999 | Smilee |
| 5,913,668 A | 6/1999 | Messer |
| 5,924,694 A | 7/1999 | Kent |
| 5,930,932 A | 8/1999 | Peterson |
| 5,933,997 A | 8/1999 | Barrett |
| 5,933,999 A | 8/1999 | McClure et al. |
| 5,937,561 A | 8/1999 | Abernethy |
| 5,959,613 A | 9/1999 | Rosenbreg et al. |
| 5,970,642 A | 10/1999 | Martin |
| 5,974,719 A | 11/1999 | Simonek |
| 6,019,375 A | 2/2000 | West, Jr. |
| 6,021,891 A | 2/2000 | Anderson |
| 6,032,796 A | 3/2000 | Hopper et al. |
| 6,042,080 A | 3/2000 | Shepherd et al. |
| 6,044,747 A | 4/2000 | Felts |
| 6,058,641 A | 5/2000 | Vecqueray |
| 6,073,381 A | 6/2000 | Farrar et al. |
| 6,086,375 A | 7/2000 | Egros |
| 6,092,662 A | 7/2000 | Frederick, Jr. et al. |

(56) References Cited

U.S. PATENT DOCUMENTS

| | | |
|---|---|---|
| 6,110,020 A | 8/2000 | Rolfi |
| 6,121,556 A | 9/2000 | Cole |
| 6,237,462 B1 | 5/2001 | Hawkes et al. |
| 6,253,482 B1 | 7/2001 | Peterson |
| 6,254,100 B1 | 7/2001 | Rinehart |
| 6,260,463 B1 | 7/2001 | Brand et al. |
| 6,269,578 B1 | 8/2001 | Callegari |
| 6,283,428 B1 | 9/2001 | Maples et al. |
| 6,289,622 B1 * | 9/2001 | Desch, Jr. ............... F41A 23/10 42/94 |
| 6,293,041 B2 | 9/2001 | Weaver |
| 6,294,759 B1 | 9/2001 | Dunn, Jr. |
| 6,305,117 B1 | 10/2001 | Hales, Sr. |
| 6,309,476 B1 | 10/2001 | Ravenscroft et al. |
| 6,338,218 B1 | 1/2002 | Hegler |
| 6,390,294 B1 | 5/2002 | Fiore et al. |
| 6,397,720 B1 | 6/2002 | Fox et al. |
| 6,439,515 B1 | 8/2002 | Powers |
| 6,439,530 B1 | 8/2002 | Shoenfish et al. |
| 6,517,133 B2 | 2/2003 | Seegmiller et al. |
| D471,248 S | 3/2003 | Jacobs |
| 6,526,687 B1 | 3/2003 | Ooney |
| D473,376 S | 4/2003 | Abate |
| 6,546,662 B1 | 4/2003 | Chong |
| 6,557,855 B2 | 5/2003 | Wu |
| 6,574,899 B1 | 6/2003 | Mostello |
| 6,575,469 B2 | 6/2003 | Lowe |
| 6,643,973 B1 | 11/2003 | Smith |
| 6,663,298 B2 | 12/2003 | Haney |
| 6,688,031 B2 | 2/2004 | Steele |
| 6,733,375 B2 | 5/2004 | Hoffman |
| 6,736,400 B1 | 5/2004 | Cesternino |
| 6,813,855 B2 | 11/2004 | Pinkley |
| 6,814,654 B2 | 11/2004 | Rolfi |
| 6,854,975 B2 | 2/2005 | Ranzinger |
| 6,860,054 B1 | 3/2005 | Mosher |
| 6,860,055 B1 | 3/2005 | Walrath |
| 6,862,833 B1 | 3/2005 | Gutner |
| 6,871,440 B2 | 3/2005 | Highfill et al. |
| 6,877,266 B1 | 4/2005 | Brownlee |
| 6,883,263 B1 | 4/2005 | Carrow |
| 6,931,777 B1 | 8/2005 | Krien |
| 6,953,114 B2 | 10/2005 | Wang et al. |
| D513,055 S | 12/2005 | Lahti |
| 6,978,569 B2 | 12/2005 | Williamson, IV et al. |
| D519,183 S | 4/2006 | Minneman |
| 7,032,494 B2 | 4/2006 | Wygant |
| D521,100 S | 5/2006 | Morrow |
| 7,043,862 B2 | 5/2006 | Franks |
| 7,055,279 B2 | 6/2006 | Flores |
| 7,062,979 B2 | 6/2006 | Day et al. |
| D524,541 S | 7/2006 | Cauley |
| 7,086,192 B2 | 8/2006 | Deros |
| 7,104,398 B1 | 9/2006 | Wisecarver |
| 7,134,663 B1 | 11/2006 | Lowe et al. |
| 7,143,986 B1 | 12/2006 | Austin et al. |
| 7,152,355 B2 | 12/2006 | Fitzpatrick et al. |
| 7,152,358 B1 | 12/2006 | LeAnna et al. |
| 7,159,711 B1 | 1/2007 | Gardner |
| 7,165,750 B2 | 1/2007 | McCuskey et al. |
| 7,188,445 B2 | 3/2007 | Lehman |
| D540,904 S | 4/2007 | Werner |
| 7,200,966 B2 | 4/2007 | Gooder |
| 7,201,376 B2 | 4/2007 | Kuosa |
| 7,207,567 B1 | 4/2007 | Brown |
| D543,604 S | 5/2007 | Minneman |
| 7,213,494 B2 | 5/2007 | James |
| 7,216,404 B1 | 5/2007 | Doyle |
| 7,222,451 B2 | 5/2007 | Keng et al. |
| 7,225,050 B2 | 5/2007 | Sutula, Jr. |
| 7,246,704 B2 | 7/2007 | Brunson et al. |
| 7,258,345 B2 | 8/2007 | Anderson, Jr. |
| D553,219 S | 10/2007 | Potterfield |
| 7,281,346 B1 | 10/2007 | Cook et al. |
| D567,895 S | 4/2008 | Cauley |
| 7,356,960 B1 | 4/2008 | Knitt |
| 7,356,961 B2 | 4/2008 | Williams |
| 7,357,250 B2 | 4/2008 | Hagemann |
| 7,363,740 B2 | 4/2008 | Kincel |
| 7,367,451 B2 | 5/2008 | Pendergraph et al. |
| 7,401,431 B2 | 7/2008 | Pierce et al. |
| 7,410,053 B2 | 8/2008 | Bowen et al. |
| D576,245 S | 9/2008 | Potterfield et al. |
| 7,421,815 B1 | 9/2008 | Moody et al. |
| 7,426,800 B2 | 9/2008 | Pierce et al. |
| 7,431,247 B2 | 10/2008 | Bobro |
| 7,481,015 B2 | 1/2009 | Mays |
| 7,536,819 B2 | 5/2009 | Popikow |
| 7,536,820 B2 | 5/2009 | Wade et al. |
| 7,549,247 B1 | 6/2009 | Reese |
| 7,584,690 B2 | 9/2009 | Cauley |
| D605,246 S | 12/2009 | Hobbs |
| 7,631,455 B2 | 12/2009 | Keng et al. |
| 7,631,877 B2 | 12/2009 | Zara |
| 7,654,498 B1 | 2/2010 | Beltz |
| 7,658,140 B2 | 2/2010 | Lombardi |
| 7,665,241 B2 | 2/2010 | Oz |
| 7,676,977 B1 | 3/2010 | Cahill et al. |
| 7,681,886 B2 | 3/2010 | Morrow et al. |
| 7,694,973 B1 | 4/2010 | Hofmeister |
| 7,713,180 B2 | 5/2010 | Wickens et al. |
| 7,726,478 B2 | 6/2010 | Potterfield et al. |
| 7,730,824 B1 | 6/2010 | Black |
| 7,743,544 B2 | 6/2010 | Laney et al. |
| 7,774,972 B2 | 8/2010 | Potterfield et al. |
| 7,779,572 B2 | 8/2010 | Potterfield et al. |
| 7,823,317 B2 | 11/2010 | Potterfield et al. |
| 7,845,267 B2 | 12/2010 | Potterfield et al. |
| 7,866,081 B2 | 1/2011 | Seuk |
| 7,883,396 B2 | 2/2011 | Potterfield et al. |
| 7,954,272 B2 | 6/2011 | Potterfield et al. |
| 7,997,021 B2 | 8/2011 | Cauley |
| 8,011,129 B2 | 9/2011 | Cauley et al. |
| 8,104,212 B2 | 1/2012 | Potterfield et al. |
| 8,104,213 B2 * | 1/2012 | Keng ................... F41A 23/10 89/40.06 |
| 8,109,028 B2 | 2/2012 | Roberts et al. |
| 8,132,351 B2 | 3/2012 | Potterfield et al. |
| 8,296,988 B2 | 10/2012 | Yale et al. |
| 8,336,708 B2 | 12/2012 | Potterfield et al. |
| 8,356,442 B2 | 1/2013 | Potterfield et al. |
| 8,371,057 B2 | 2/2013 | Coffield et al. |
| 8,444,056 B2 | 5/2013 | Gamez et al. |
| 8,496,212 B2 | 7/2013 | Keng et al. |
| 8,567,106 B2 * | 10/2013 | Chvala ................ F41A 23/10 248/169 |
| 8,621,773 B2 | 1/2014 | Morrow et al. |
| 8,636,429 B2 * | 1/2014 | Chen ................... F16M 11/32 396/428 |
| 8,683,730 B1 | 4/2014 | Moore |
| 9,151,561 B2 | 10/2015 | Morrow et al. |
| 9,188,843 B2 * | 11/2015 | Li ....................... F16M 11/242 |
| 9,303,940 B2 * | 4/2016 | Bonelli ................ F16M 11/14 |
| 9,618,291 B1 | 4/2017 | Henderson |
| 9,702,653 B2 | 7/2017 | Cauley, Jr. et al. |
| 10,254,069 B2 * | 4/2019 | Palu .................... F41A 23/10 |
| 10,295,292 B2 * | 5/2019 | Ding ................... F41A 23/06 |
| 10,317,162 B2 | 6/2019 | Morrow et al. |
| 10,323,897 B1 * | 6/2019 | Ding ................... F41A 23/14 |
| 10,328,322 B1 | 6/2019 | King |
| 10,408,555 B2 * | 9/2019 | Flood, Jr .............. F41A 23/10 |
| 10,612,719 B2 * | 4/2020 | Li ....................... F16M 11/245 |
| 10,845,679 B2 * | 11/2020 | Zhu .................... F16M 11/08 |
| 11,371,793 B2 * | 6/2022 | Ding ................... F41A 23/02 |
| 11,391,533 B2 * | 7/2022 | Favory ................ F41A 23/10 |
| 2002/0195752 A1 | 12/2002 | Yang |
| 2003/0234205 A1 | 12/2003 | McGuyer et al. |
| 2004/0112777 A1 | 7/2004 | Huang |
| 2004/0134113 A1 | 7/2004 | Deros et al. |
| 2005/0000141 A1 | 1/2005 | Cauley et al. |
| 2005/0115137 A1 | 6/2005 | Minneman |
| 2006/0065560 A1 | 3/2006 | Dickenson et al. |
| 2006/0175213 A1 | 8/2006 | Hurt et al. |
| 2006/0230664 A1 | 10/2006 | Eddins |

(56) References Cited

U.S. PATENT DOCUMENTS

| | | |
|---|---|---|
| 2006/0254111 A1 | 11/2006 | Giauque et al. |
| 2006/0277811 A1 | 12/2006 | Peterson |
| 2007/0051028 A1 | 3/2007 | Stordal |
| 2007/0068379 A1 | 3/2007 | Sween et al. |
| 2007/0068835 A1 | 3/2007 | Buie, III |
| 2007/0074439 A2 | 4/2007 | Cauley et al. |
| 2007/0094911 A1 | 5/2007 | Rush et al. |
| 2007/0113460 A1 | 5/2007 | Potterfield et al. |
| 2007/0234623 A1 | 10/2007 | Carney |
| 2007/0256346 A1 | 11/2007 | Potterfield et al. |
| 2007/0295197 A1 | 12/2007 | Potterfield |
| 2008/0023379 A1 | 1/2008 | Potterfield et al. |
| 2008/0054570 A1 | 3/2008 | Potterfield et al. |
| 2008/0061509 A1 | 3/2008 | Potterfield |
| 2008/0128002 A1 | 6/2008 | Jeffs |
| 2008/0156671 A1 | 7/2008 | Jansson |
| 2008/0174071 A1 | 7/2008 | Potterfield et al. |
| 2008/0178641 A1 | 7/2008 | Himmen |
| 2008/0224000 A1* | 9/2008 | Yang ............. F16M 11/16 248/163.1 |
| 2008/0263928 A1 | 10/2008 | Potterfield |
| 2009/0025267 A1 | 1/2009 | Reinert et al. |
| 2009/0126250 A1 | 5/2009 | Keng |
| 2009/0188146 A1 | 7/2009 | Werner |
| 2009/0250567 A1* | 10/2009 | Raynaud ............ F16M 11/16 248/168 |
| 2010/0019109 A1* | 1/2010 | Liu ................ F16M 11/16 248/188 |
| 2010/0102178 A1 | 4/2010 | Smith et al. |
| 2010/0126055 A1 | 5/2010 | Potterfield |
| 2010/0138032 A1 | 6/2010 | Potterfield |
| 2010/0236125 A1 | 9/2010 | Morrow et al. |
| 2010/0270201 A1 | 10/2010 | Cauley et al. |
| 2011/0024985 A1 | 2/2011 | Potterfield et al. |
| 2011/0036214 A1 | 2/2011 | Potterfield |
| 2011/0094140 A1 | 4/2011 | Letson |
| 2011/0192069 A1 | 8/2011 | Potterfield et al. |
| 2012/0175844 A1 | 7/2012 | Potterfield |
| 2012/0186125 A1 | 7/2012 | Werner |
| 2013/0086835 A1 | 4/2013 | Minneman |
| 2014/0115940 A1* | 5/2014 | Bonelli ............ F41A 23/10 42/94 |
| 2014/0237882 A1 | 8/2014 | Banes et al. |
| 2015/0354913 A1 | 12/2015 | Morrow et al. |
| 2016/0116103 A1* | 4/2016 | Gabrielli ........... F16M 11/24 248/125.8 |
| 2016/0193518 A1 | 7/2016 | Baxter et al. |
| 2017/0102203 A1 | 4/2017 | Cauley, Jr. et al. |
| 2017/0146891 A1* | 5/2017 | Chen ............... G03B 17/561 |
| 2018/0324360 A1* | 11/2018 | Gabrielli ........... F16M 11/28 |
| 2019/0003635 A1* | 1/2019 | Li ................. F16M 11/242 |
| 2019/0072355 A1* | 3/2019 | Pop ................ F41A 23/10 |
| 2019/0285376 A1 | 9/2019 | Bales |
| 2020/0033089 A1 | 1/2020 | Morrow et al. |
| 2020/0081325 A1* | 3/2020 | Zhu ............... F16M 11/08 |
| 2021/0190261 A1* | 6/2021 | Warner ............. F16M 11/16 |
| 2021/0278031 A1* | 9/2021 | Speggiorin .......... F16M 11/32 |

FOREIGN PATENT DOCUMENTS

| | | | |
|---|---|---|---|
| GB | 475080 | 11/1937 | |
| WO | WO-2020232176 A1 * | 11/2020 | ........... F16M 11/041 |

OTHER PUBLICATIONS

Lahti Company Brochure, "Rifle Evaluator: No Pain, No Fear, No Flinching, No Body Movement," www.lahticompany.com, 2 pgs., Undated.

Lahti Company, Evaluator Brochure, http://www.lathicompany.com/Forms/EvaluatorBrochure2.jpg, 2 pgs., accessed Jan. 16, 2006.

MacksPW.com, "Desert Mountain Bench Master Rifle Rest," http://www.macksqw.com/Item-i-DESBM1, © 2004-2008, 1 pg. [Internet accessed Jul. 22, 2008].

Midway USA, "Shooters Ridge Steady Point Rifle Shooting Rest," http://www.midwayusa.com/eproductpage.exe/showproduct?saleitemid=826745&t=11082005, 2005, 5 pgs. [Internet accessed on Aug. 6, 2008].

Midway USA. "Tipton Range Box with Ultimate Rifle, Handgun Cleaning Kit (No Solvents)". <URL: http://www.midwayusa.com/rewriteaproducU135086>. 2 pgs. The date on which the Tipton Range Box was first on sale is not known, but is believed to be circa 2004.

MidwayUSA, "ADG Rifle Shooting Rest," http://www.midwayusa.com/eproductpage.exe/showproduct?saleitemid=992071&t=11082005, 2005, 3 pgs. [Internet accessed on Aug. 6, 2008].

MidwayUSA, "Caldwell Full Length Fire Control Shooting Rest," http://www.midwayusa.com/eproductpage.exe/showproduct?saleitemid=683866&t=11082005, 2005, 3 pgs. [Internet accessed on Aug. 6, 2008].

MidwayUSA, "Caldwell Lead Sled DFT Rifle Shooting Rest," http://www.midwayusa.com/eproductpage.exe/showproduct?saleitemid=149023&t=11082005, 2005, 6 pgs. [Internet accessed on Aug. 6, 2008].

MidwayUSA, "Caldwell Lead Sled Rifle Shooting Rest," http://www.midwayusa.com/eproductpage.exe/showproduct?saleitemid=152664&t=11082005, 2005, 8 pgs. [Internet accessed on Aug. 6, 2008].

MidwayUSA, "Caldwell Steady Rest NXT Rifle Shooting Rest," http://www.midwayusa.com/eproductpage.exe/showproduct?saleitemid=838651&t=11082005, 2005, 4 pgs. [Internet accessed on Aug. 6, 2008].

MidwayUSA, "Caldwell Zero-Max Rifle Shooting Rest," http://www.midwayusa.com/eproductpage.exe/showproduct?saleitemid=726222&t=11082005, 2005, 3 pgs. [Internet accessed on Aug. 6, 2008].

MidwayUSA, "CTK Precision P3 Ultimate Shooting Rest," http://www.midwayusa.com/eproductpage.exe/showproduct?saleitemid=114699&t=11082005, 2005, 2 pgs. [Internet accessed on Aug. 6, 2008].

MidwayUSA, "Hyskore® dangerous Game Rifle Shooting Rest," http://www.midwayusa.com/eproductpage.exe/showproduct?saleitemid=729197&t=11082005, 2005, 3 pgs. [Internet accessed on Aug. 6, 2008].

MidwayUSA, "Hyskore® Precision Gas Dampened Recoil Reducing Rifle Shooting Rest," http://www.midwayusa.com/eproductpage.exe/showproduct?saleitemid=838848&t=11082005, 2005, 3 pgs. [Internet accessed on Aug. 6, 2008].

MidwayUSA, "Hyskore® Swivel Varmint Rifle Shooting Rest," http://www.midwayusa.com/eproductpage.exe/showproduct?saleitemid=587606&t=11082005,2005, 3 pgs. [Internet accessed on Aug. 6, 2008].

MidwayUSA, "Shooters Ridge Steady Point Rifle Shooting Rest with Vise," http://www.midwayusa.com/eproductpage.exe/showproduct?saleitemid=341095&t=11082005, D 2005, 4 pgs. [Internet accessed on Aug. 6, 2008].

MidwayUSA, "Shooting Supplies—Shop Everything for Your Firearm at MidwayUSA," http://www.midwayusa.com/browse/BrowseProducts.aspx?categoryStrin . . . , 15 pgs. [Internet accessed on Jul. 21, 2008].

MidwayUSA, "Stoney Point Bench Anchor Rifle Shooting Rest," http://www.midwayusa.com/eproductpage.exe/showproduct?saleitemid=347174&t=11082005, 2005, 2 pgs. [Internet accessed on Aug. 6, 2008].

Milek, B., "Handloading for Hunting" New Products from RCBS, Lee, Accurate Arms, Peterson's Hunting, Mar. 1985, p. 21. 1 pg.

Millett, "BenchMaster Shooting Rests," 1 pg. Undated.

MTM Case-Gard. "Gun Maintenance Centers." 2 pgs. The date on which the MTM Gun Maintenance Center was first on sale is not known, but is believed to be circa 2004.

MTM Case-Gard. "Rifle rest and pistol shooting rest". <URL: http://www.mtmcasegard.com/products/shooting/shoo.html>. 3 pgs. The date on which the MTM Site-In-Clean was first on sale is not known, but is believed to be circa 2004.

MTM Shoulder-Gard Rifle Rest, MTM Case-Gard, p. 2 "Rests", 1 pg.

(56) References Cited

OTHER PUBLICATIONS

Precision Shooting, Inc., Bald Eagle Front Rest, The Accurate Rifle, vol. 6, Issue No. 4, May 2003, p. 47. 1 pg.
Protektor Model, "The Original Leather Rifle and Pistol Rest," http://www.protektormodel.com/, 12 pgs. [Internet accessed on Feb. 14, 2006].
Shooters Ridge, "Deluxe Rifle Rest," http://www.shootersridge.com, 1 pg. [Internet accessed Jul. 21, 2008].
Shooters Ridge, "Shooting Rest with Gun Vise," http://www.shootersridge.com, 1 pg. [Internet accessed Jul. 17, 2008].
Sinclair International, Sinclair Shooting Rests, Products for the Precision Shooter, 2002, Issue No. 2002-B, pp. 76-78.
Sweeney, P "Gunsmithing: Measure Headspace," Peterson's Rifleshooter, http://www.rifleshootermag.com/gunsmithing/headspace_0612/, 4 pgs. [Internet Accessed Dec. 11, 2004].
Tenex Precision Co. "Recoil A-Rest-R" Product Pictures, 4 sheets, Riverside CA.
The Sportsman's Guide. "Plano Shooters Case!" <URL: http://www.sportsmansguide.com/cb/cb.asp?a=148225>. 3 pgs. The date on which the Plano Shooters Case was first on sale is not known, but is believed to be circa 2004.
Cabela's, "Sharp Shooter Rifle Rest," http://www.cabelas.com/cabelas/en/templates/links/link.jsp?id=0005816222738a&type=product&cmCat=, © 1996-2008, 2 pgs. [Internet accessed on Aug. 6, 2008].
"American Rifleman: What to do about recoil," LookSmart, http://www.findarticles.com/p/articles/mi_qa3623/is_199907/ai_n886159/print, pp. 1-4, accessed Jan. 4, 2006.
"Cleaning Cradles: Sinclaire Cleaning Cradles" p. 21. 1 pg. The date on which the Sinclair Folding Cleaning Cradle was first on sale is not known, but is believed to be circa 2004.
"Decker Rifle Vise", 1 pg. The date on which the Decker Rifle Vise was first on sale is not known, but is believed to be circa 2004.
"The Grabber and Hustler '76," MEC—Mayville Engineering Company, Inc., 2 pgs., undated.
"Uncle Bud's Bull Bags," http:www.unclebudscss.com/pages/Bulls%20bags.html, 2 pgs. [Internet accessed on Feb. 14, 2006].
"Uncle Bud's Udder Bag," http:www.unclebudscss.com/pages/Udder%20Bags.html, 2 pgs. [Internet accessed on Feb. 14, 2006].
1Shop2.com. "Hoppe's Gunsmith's Fully Adjustable Bench Vise", 3 pgs. The date on which The Hoppe's Gunsmith's Fully Adjustable Bench Vise was first on sale is not known, but is believed to be circa 2004.
AcuSport Outdoor Sporting Products, 3 pgs.
Amazon.com, "CTK® P3 Ultimate Shooting Rest," Sports & Outdoors, http://www.amazon.com/CTK%C2%AE-P3-Ultimate-Shooting-Rest/dp/ . . . , 1 pg. [Internet accessed on Jul. 22, 2008].
Amazon.com, "SHTRS RDG Steady PNT Rifle Rest DLX, Grips/Pads/Stocks, Gun Accessories, Hunting & Shooting Accessories, Hunting Gear, Fishing & Hunting," http://www.amazon.com/STEADY-Accessories-Hunting-Shooting-Fishin . . . , 1 pg. [Internet accessed on Jul. 22, 2008].
Amazon.com, "Stoney Point Adjustable Shooting Rest w/Bag," Sports & Outdoors, http://www.amazon.com/Stoney-Point-Adjustable-Shooting-Rest/dp/BO . . . , 1 pg. [Internet accessed on Jul. 22, 2008].
Basspro.com, "Bass Pro Shops Outdoors Online: Offering the best in Fishing, Hunting and Outdoor Products," http://www.basspro.com/webapp/wcs/stores/servlet/Product 10151 -1 10001 95064 SearchResults, 2 pgs. [Internet accessed on Aug. 6, 2008].
Battenfeld Technologies, Inc., "Gun Vise," Tipton Gun Cleaning Supplies, Battenfeld Technologies, Inc. 2004 Catalog, p. 32, Product No. 782-731, 2 pgs.
Battenfeld Technologies, Inc., "Steady Rest Portable Shooting Rest," file://C:\DOCUME-1\DUTCD\LOCALS-1\Temp\PQ28V28J.htm, 1 pg., accessed Jan. 25, 2006.
Big Boy Gun Toys, "Shooting Rest," http://www.bigboyguntoys.com/shootingrest.htm, 1 pg. [Internet accessed on Jul. 18, 2008].
Boyt Harness Company, Product Catalog, http://www.boytharness.com/catalog/index.php?cPath=22, 2 pgs. [Internet accessed on Jul. 21, 2008].
Brownells, Inc., Catalog No. 41, 1988-1989, 3 pgs.
Brownells, Inc., Catalog No. 57, 2004-2005, 2 pgs.
Brownells, Inc., Catalog No. 47, 1994-1995, 2 pgs.
Brownells, Inc., Sight Base Cutters, Faxed Dec. 17, 2003, 1 pg.
Cabela's Hunting Fishing and Outdoor Gear Master Catalog, Fall2002, Edition II, Minimizer Rifle Rest, Item No. SC-22-4332 and SC-22-4333, p. 492.
Cabela's: World's Foremost Outfitter. "HySkore Sighting System and Cleaning Vise". 1 pg. The date on which the HySkore Sighting System and Cleaning Vise was first on sale is not known, but is believed to be circa Jan. 2005. However, a prototype of this product may have been shown to buyers at Cabela's circa Aug. 2004.
Cabela's. "Master Catalog Fall 2003: Late-Season Edition". Cover page and p. 416. 2 pgs.
Cabela's, "BenchBuddy® Gun Rest," http://www.cabelas.com/cabelas/en/templates/links/link.jsp?id=0005819221954a&type=product&cmCat=, © 1996-2008, 2 pgs. [Internet accessed on Aug. 6, 2008].
Cabela's, "Elite Rifle Rest," http://www.cabelas.com/cabelas/en/templates/links/link.jsp?id=0005817227855a&type=product&cmCat=, © 1996-2008, 2 pgs. [Internet accessed on Aug. 6, 2008].
Cabela's, "Hyskore® Dangerous Game™ Machine Rest," http://www.cabelas.com/cabelas/en/templates/links/link.jsp?id=0044091228566a&type=product&cmCat=, © 1996-2008, 2 pgs. [Internet accessed on Aug. 6, 2008].
Cabela's, "Hyskore® Ultimate Sighting Rest," http://www.cabelas.com/cabelas/en/templates/links/link.jsp?id=0024152226083a&type=product&cmCat=, © 1996-2008, 2 pgs. [Internet accessed on Aug. 6, 2008].
Cabela's, "Nitro Shoulder Shield Rest," http://www.cabelas.com/cabelas/en/templates/links/link.jsp?id=0040862228231a&type=product&cmCat=, © 1996-2008, 2 pgs. [Internet accessed on Aug. 6, 2008].
Cabela's, "Premier Rifle Rest," http://www.cabelas.com/cabelas/en/templates/links/link.jsp?id=0020904227856a&type=product&cmCat= . . . , © 1996-2008, 2 pgs. [Internet accessed on Aug. 6, 2008].
Cabela's, "Secure Bench Rest," http://www.cabelas.com/cabelas/en/templates/links/link.jsp;jsessionid=4F0LP0OW2HMRLLAOBBISCOF . . . , © 1996-2008, 2 pgs. [Internet accessed on Aug. 6, 2008].
Cabela's, "Sharp Shooter Auto Magnum Rifle Rest," http://www.cabelas.com/cabelas/en/templates/links/link.jsp?id=0054107229088a&type=product&cmCat=, © 1996-2008, 2 pgs. [Internet accessed on Aug. 6, 2008].
Cabela's, "Shooting Benches & Portable Rifle Shooting Bench Rest," http://www.cabelas.com/ssubcat-1/cat20793.shtml, 3 pgs. [Internet accessed Jul. 18, 2008].
Cabela's, "Sure Shot Shooting Vise/Rest," http://www.cabelas.com/cabelas/en/templates/product/standard-item.jsp?id=00348272277 . . . , © 1996-2008, 2 pgs. [Internet accessed on Jul. 15, 2008].
Caldwell Shooting Supplies, 2006 Catalog, pp. 18, 5, 12, 14 and 15. 5 pgs.
Californiavarmintcallers.com—Forum, http://californiavarmintcallers.com/community/modules/newbb/viewtopic.php?topic_id=10&forum=9&PHPSESSID=074ed8c7 . . . pp. 1-4 accessed Jan. 16, 2006.
Canadian Camo, "Gun Rest," https://media5.magma.ca/www.canadiancamo.com/catalog/product_info.php?products_id= . . . , 2 pgs. [Internet accessed on Feb. 13, 2006].
Champion Traps & Target, 2005 Product Catalog, 12 pgs.
Hyskore: Professional Shooting Accessories, "Hydraulic Trigger Release," www.hyskore.com, 7 pgs. [Internet accessed Feb. 22, 2006].
CTK Precision, All Products, http://www.ctkprecision.com/index.asp?PageAction=VI EWCATS&Cate . . . , 3 pgs. [Internet accessed on Jul. 22, 2008].
CV-500, 3 pgs. [product photos].
E. Arthur Brown Company, "A Shooting Rest that Really Works . . . ," http://www.eabco.comfTargetShooting01.html, © 2007-2008, 1 pg. [Internet accessed Jul. 18, 2008].

(56) References Cited

OTHER PUBLICATIONS

Edgewood Shooting Bags Catalog, http://www.edgebag.com/catalog.php, 7 pgs. [Internet accessed on Feb. 14, 2006].
Ellett Brothers, Rests & Gun Vises, 3 pgs.
Four photos of the Lohman Sight Vise. 4 pgs. The date on which the Lohman Sight Vise was first on sale is not known, but is believed to be circa 2004.
Grafix® Plastics, http://www.grafixplastics.com/plastic_film_g.asp?gclid=CK-5-7gnY4CFRVNhQodjFhfSQ, 29 pgs. [Internet accessed on Aug. 30, 2007].
"Gun Rest-Shooting Rest-Rifle Rests," http://www.exploreproducts.com/gunrests-shootingrests.htm, 6 pgs. [Internet accessed Jul. 18, 2008].
Hyskore, "Rest—Dangerous Game Machine Rest," Hyskore Rest, Professional firearm rests, http://www.hyskore.com/rests.htm, 2 pgs. [Internet accessed Jul. 21, 2008].
Hyskore: Professional Shooting Accessories, "Dangerous Game Machine Rest," www.hyskore.com, 10 pgs. [Internet accessed Feb. 22, 2006].

\* cited by examiner

MULTI-LEGGED EQUIPMENT SUPPORT HAVING LEG ANGLE ADJUSTMENT

CROSS-REFERENCE TO RELATED APPLICATION

The present application claims priority to U.S. Provisional Patent App. No. 62/948,946, filed Dec. 17, 2019, which is hereby incorporated by reference in its entirety.

FIELD

The present disclosure generally relates to equipment supports, and more particularly to stands such as bipods, tripods, etc., for supporting equipment such as weapons, optics, cameras, or other equipment.

BACKGROUND

Bipods, tripods, and other types of equipment stands are used to support various types of equipment. For example, hunters may use such stands to support an optic (e.g., spotting scope), a weapon (e.g., rifle), or a camera. Such equipment supports are also used in other areas.

SUMMARY

In one aspect, a multi-legged equipment support comprises a hub and a set of legs. The set of legs includes at least first and second legs. Each leg of the set of legs includes a head. Each head is pivotably connected to the hub for pivoting about a respective pivot axis. Each leg is pivotable with respect to the hub about the respective pivot axis outward from a stowed position to at least one operational pivoted position. The equipment support includes leg angle stop structure including a first stop and a corresponding first set of blockers. At least one of the first leg or the hub includes the first stop. The other of the at least one of the first leg or the hub includes the first set of blockers. The first set of blockers comprises a first first leg blocker and a second first leg blocker. At least one of the first stop or the first set of blockers is movable with respect to the hub to selectively arrange the first stop in registration with at least one of the first first leg blocker or second first leg blocker. The first first leg blocker is arranged to engage the first stop when the first stop is in registration with the first first leg blocker to stop outward pivoting of the first leg at a first preset operational pivoted positon of the first leg. The second first leg blocker is arranged to engage the first stop when the first stop is in registration with the second first leg blocker to stop outward pivoting of the first leg at a second preset operational pivoted position of the first leg. The first leg is pivotable outward a greater degree from the stowed position to the second preset operational pivoted position than from the stowed position to the to the first preset operational pivoted position.

In another aspect, a multi-legged equipment support comprises a hub and a set of legs. The set of legs includes at least first and second legs. Each leg of the set of legs includes a head. Each head is pivotably connected to the hub for pivoting about a respective pivot axis. At least the first leg is pivotable with respect to the hub about the respective pivot axis outward from a stowed position to at least first and second preset operational pivoted positions. A first actuator is associated with the first leg. The first actuator is movable with respect to the head of the first leg between first and second preset locations. The first leg is pivotable outward from the stowed position to the first preset operational pivoted position when the first actuator is in the first preset location. The first leg is pivotable outward from the stowed position to a second preset operational pivoted position different from the first preset operational pivoted position when the first actuator is in the second preset location. A first retainer is arranged to maintain the first actuator in at least one of the first preset location or the second preset location irrespective of the first leg being in the first or second operational pivoted positions.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
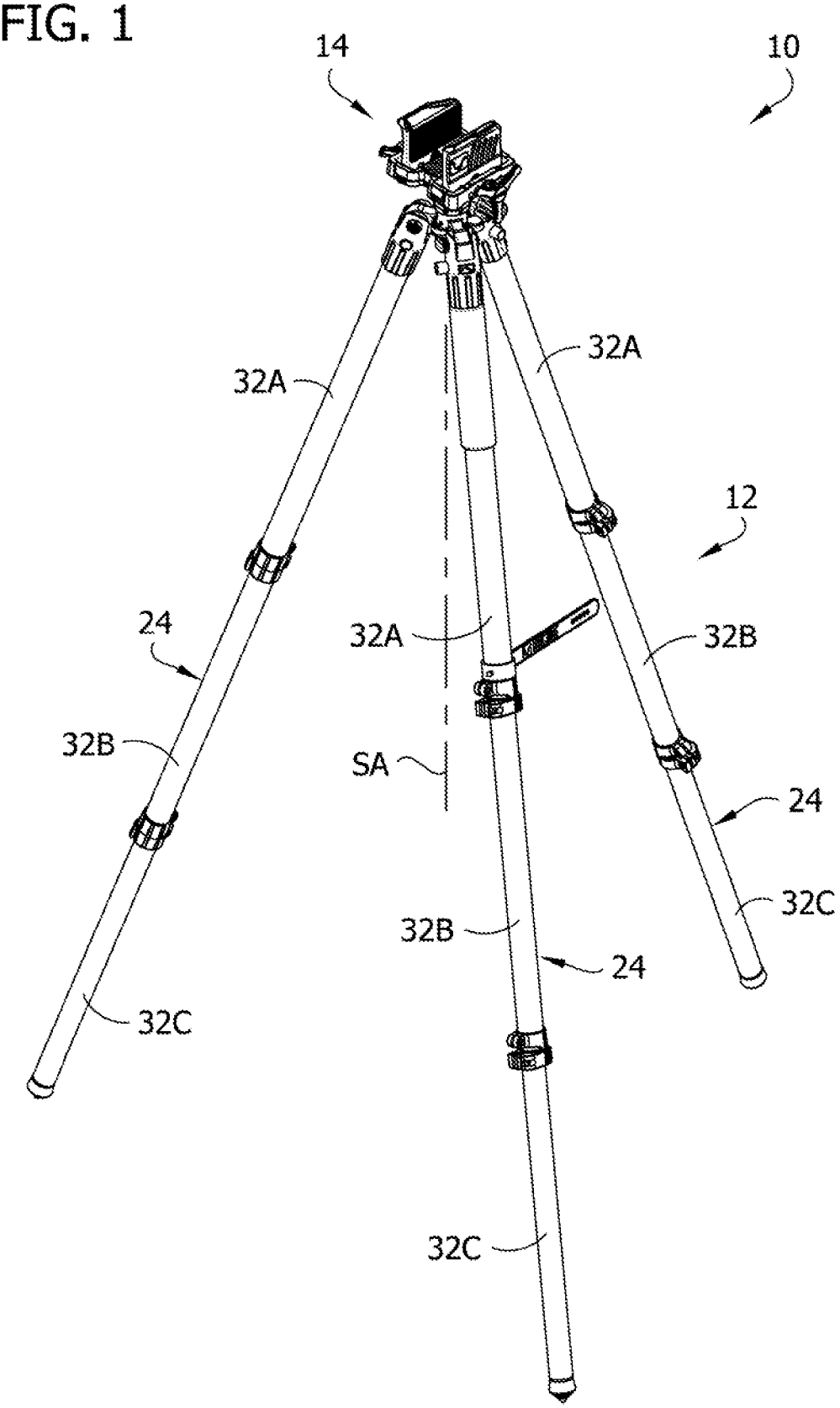
FIG. 1 is a perspective of a multi-legged support of the present disclosure.
Figure 2:
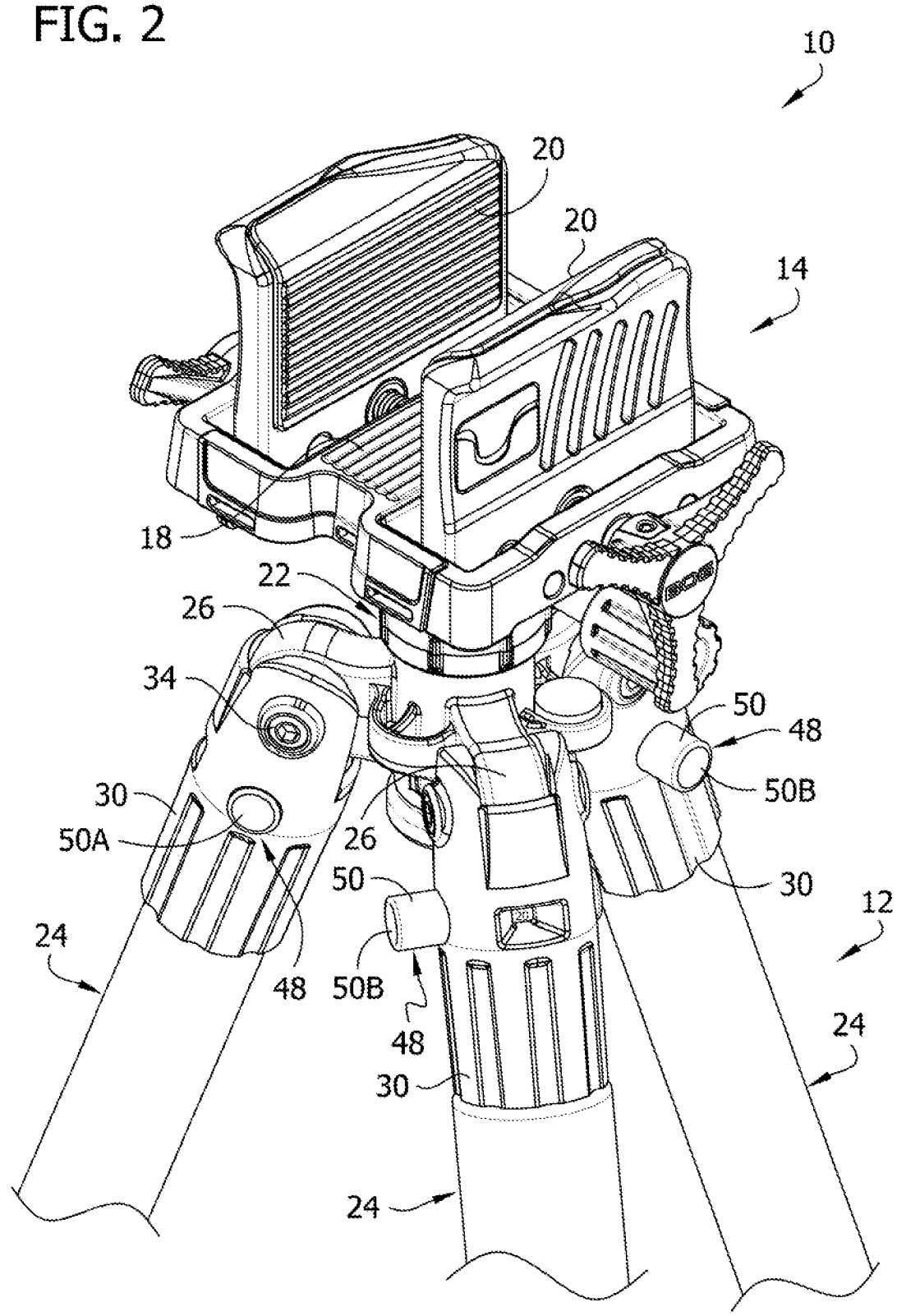
FIG. 2 is a fragmentary perspective of the multi-legged support.
Figure 3:
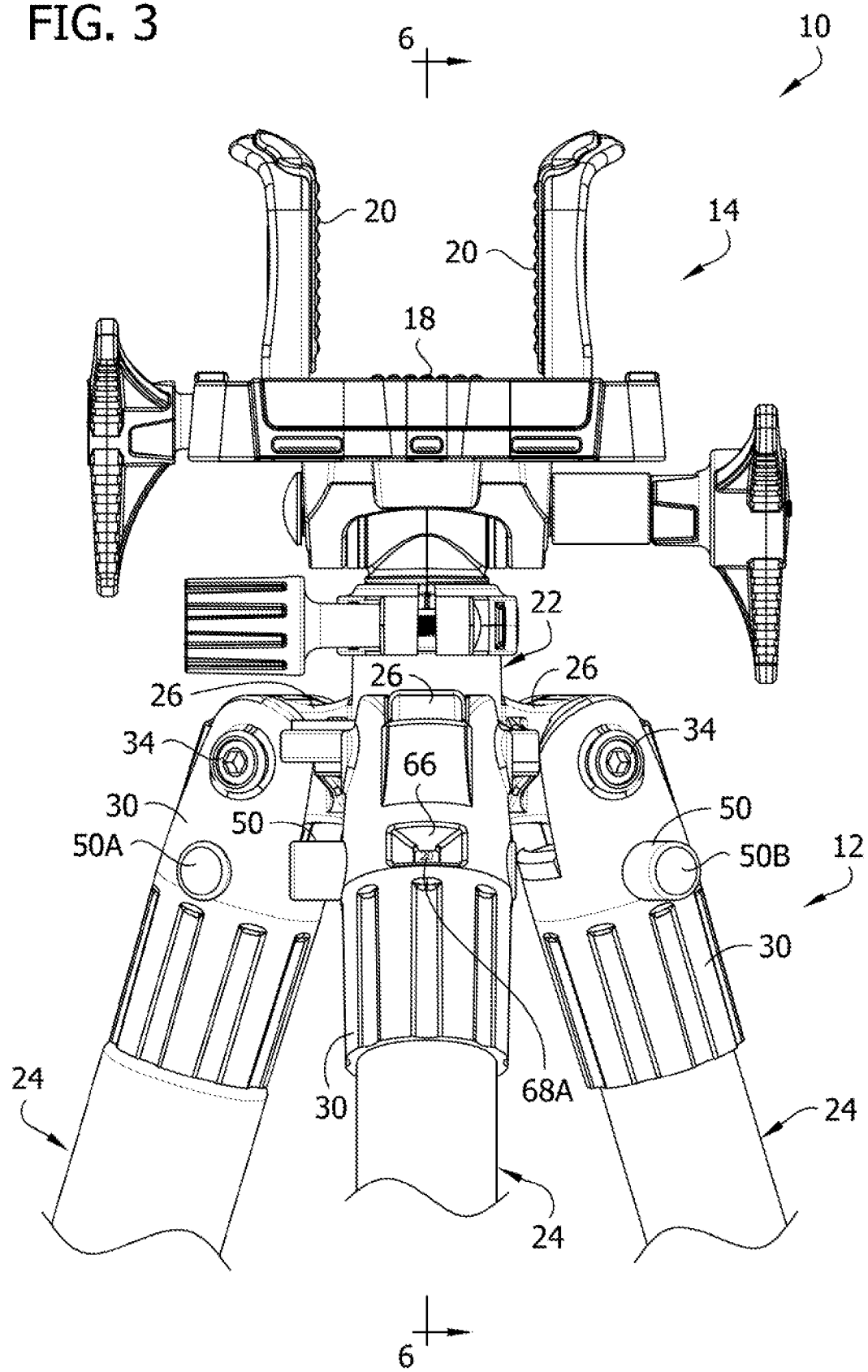
FIG. 3 is a fragmentary front elevation of the multi-legged support.

Referring to FIG. 1, a multi-legged support of the present disclosure is indicated by 10. The multi-legged support can be used to support a variety of objects, such as cameras, optics, and/or weapons (e.g., firearm), collectively referred to hereafter as equipment. In the illustrated embodiment, the multi-legged support 10 comprises a tripod having three legs, but it will be understood that multi-legged supports having other numbers of legs (e.g., two, four, etc.) can be used without departing from the scope of the present disclosure.

The multi-legged support 10 includes a frame 12 and an equipment holder 14 (broadly, "equipment support") supported by the frame. The equipment holder 14 includes a cradle comprising a bed 18 and opposing jaws 20 for clamping equipment to be supported by the multi-legged support 10. The equipment holder 14 is adjustable (e.g., pivotable about multiple axes) to change an orientation of the supported equipment with respect to the frame 12. It will be appreciated that other types of equipment holders can be used without departing from the scope of the present disclosure. For example, the equipment holder may be configured to support the equipment in other ways (e.g., without clamping). The equipment holder 14 may have a construction and connection to a hub 22 such as disclosed in co-assigned U.S. Pat. No. 10,514,225, which is hereby incorporated by reference in its entirety.

The frame 12 includes a stand comprising the hub 22 and a plurality of legs 24. The hub 22 includes three arms 26 protruding radially from a main body of the hub. The legs 24 each comprise a head 30 and a plurality of telescopically connected leg sections 32A-32C extending downward from the head. The legs 24 can be extended and retracted by telescoping the leg sections 32A-32C out of and into each other. The heads 30 are pivotably connected to the arms 26 of the hub by fasteners 34 defining pivot connections.

The legs 24 are pivotable about the pivot connections between stowed positions and operational (deployed) positions. In a stowed configuration (not shown) of the multi-legged support 10, the legs 24 are pivoted toward each other to extend generally alongside each other and alongside and/or generally parallel to a stowed axis SA extending downward from the equipment holder 14. In such a configuration, the legs 24 could be retracted to provide a compact stowed arrangement. In an operational configuration (e.g., FIG. 1) of the multi-legged support 10, the legs 24 (retracted, or partially or fully extended) are pivoted away from each other (and away from the stowed axis SA). Each leg 24 is pivotable to a plurality of preset operational pivoted positions in which the legs extend at predetermined angles with respect to the stowed axis SA. In the illustrated embodiment, the legs 24 can be pivoted to three different preset operational pivoted positions. It will be appreciated that, if desired, the legs 24 can be pivoted to non-preset positions in the range of movement between the stowed and preset positions. Moreover, other numbers of preset positions could be provided without departing from the scope of the present disclosure.

The hub 22 and legs 24 include corresponding leg angle stop structure configured to stop pivoting of the legs and define the preset operational pivoted positions of the legs. In the illustrated embodiment, the leg angle stop structure includes a plurality of blockers 40, 42, 44 (each having a respective blocking surface) on each arm 26, and stops 46 defined by adjusters 48 carried by the heads 30 of the legs 24. In a preset operational pivoted position of a leg 24, the stop 46 abuts a selected one of the blockers 40, 42, 44 (whichever blocker the stop is in registration with) to stop and/or prevent further outward pivoting movement of the leg.

In the illustrated embodiment, each leg 24 has three preset operational pivoted positions defined by the blockers 40, 42, 44. A first preset operational pivoted position is defined by a first blocker 40. A second preset operational pivoted position is defined by a second blocker 42. A third preset operational pivoted position is defined by a third blocker 44. The three blockers 40, 42, 44 are angularly offset with respect to the pivot axis of the leg 24. In the second preset operational pivoted position (not shown), the leg 24 is pivoted outwardly more (a greater degree with respect to the stowed axis SA) than in the first operational position (e.g., FIG. 1), and in the third operational position (not shown) the leg is pivoted outwardly more than in the second operational position. For example without limitation, the first blocker 40 may permit pivoting of the leg to a 20 degree angle (broadly, in an inclusive range of between 10 and 45 degrees) with respect to the stowed axis SA (e.g., for use in a standing position), the second blocker 42 may permit pivoting of the leg to a 45 degree angle (broadly, in an inclusive range of between 25 and 70 degrees) with respect to the stowed axis (e.g., for use in a sitting position), and the third blocker 44 may permit pivoting of the leg to an 85 degree angle (broadly, in an inclusive range of between 70 and 90 degrees) with respect to the stowed axis (e.g., for use in a prone position). Other angles can be used without departing from the scope of the present disclosure.

Figure 4:
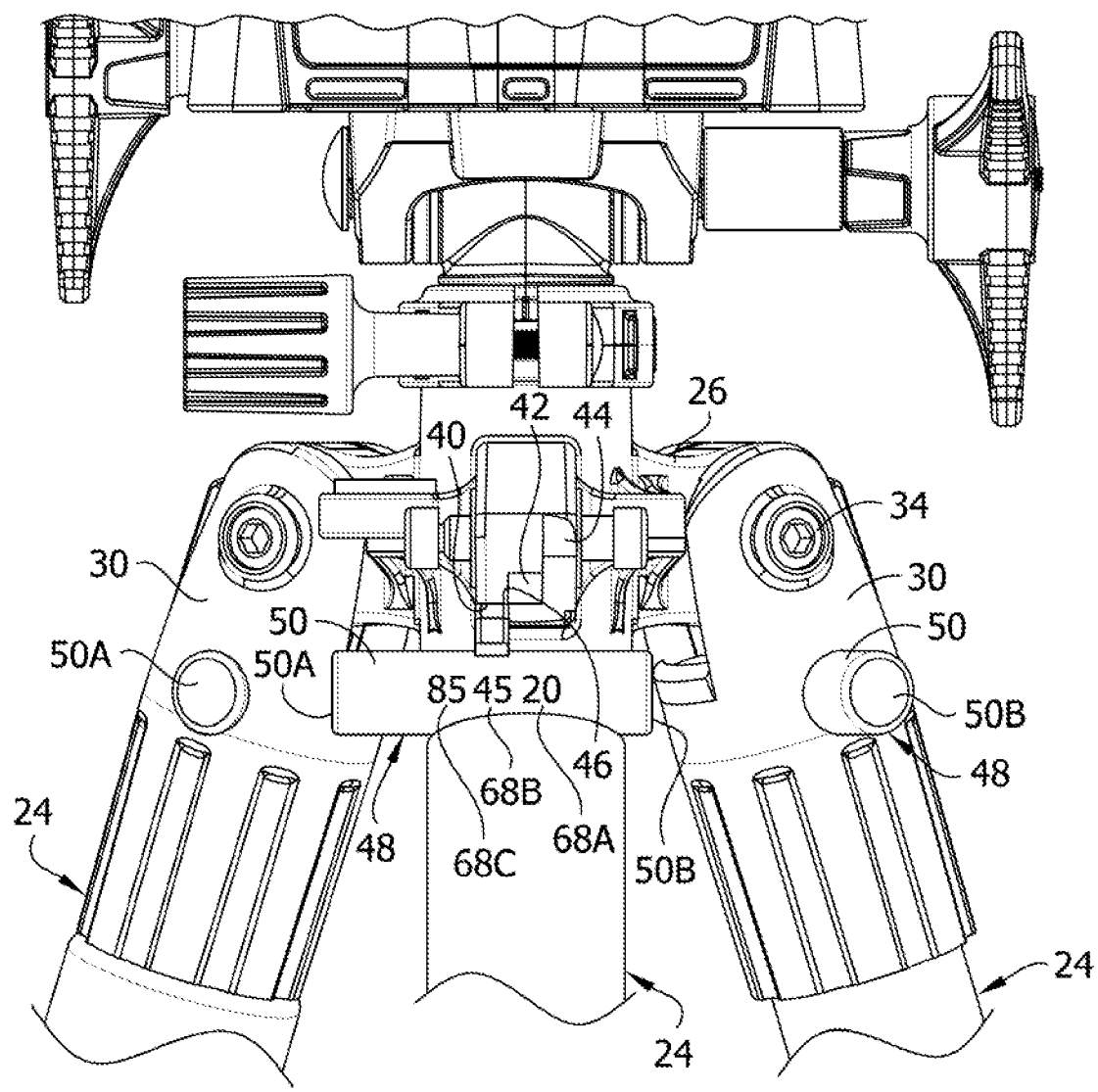
FIG. 4 is a fragmentary front elevation of the multi-legged support, a head of a leg of the multi-legged support removed.
Figure 5:
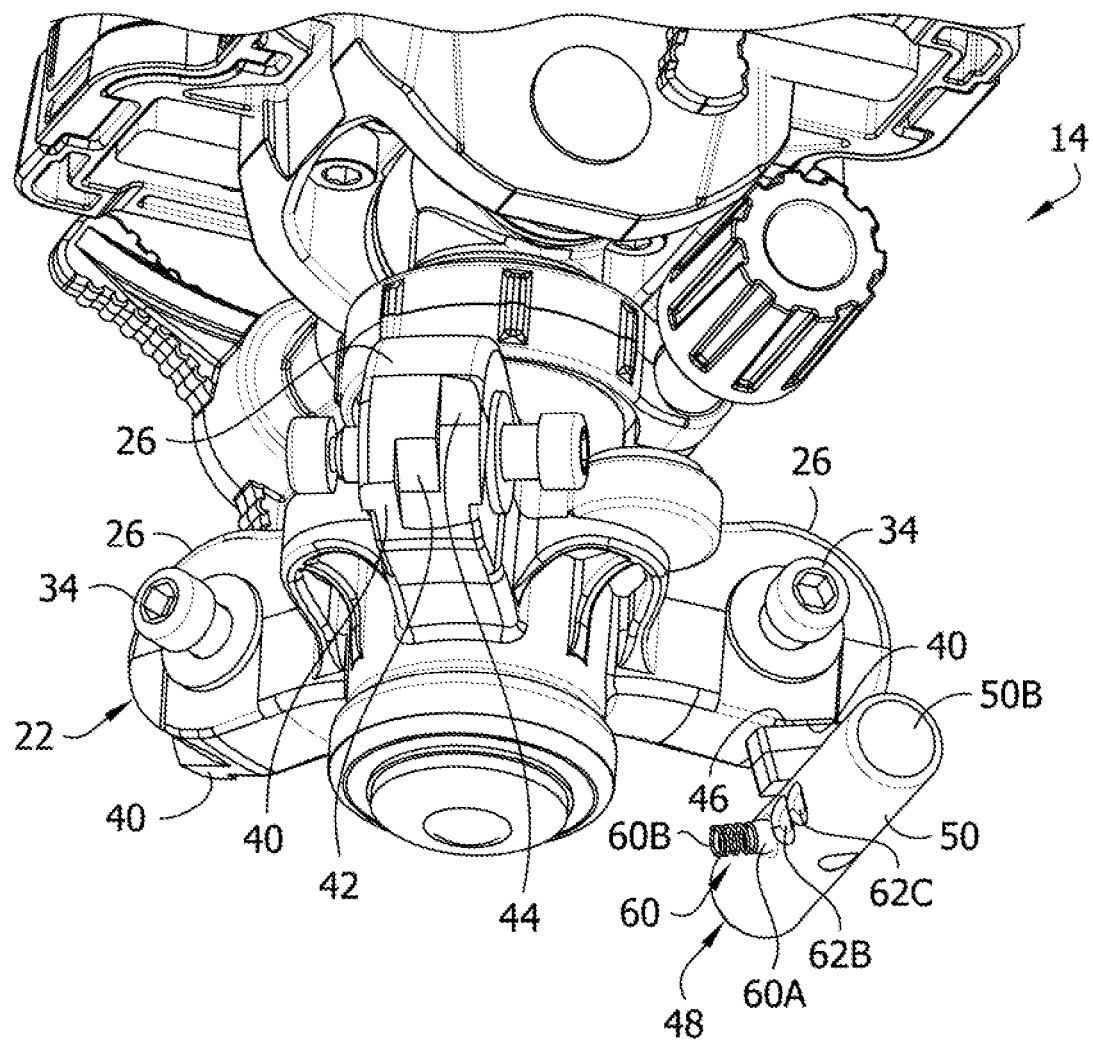
FIG. 5 is a fragmentary bottom perspective of the multi-legged support having legs and two of three leg angle adjusters removed.
Figure 6:
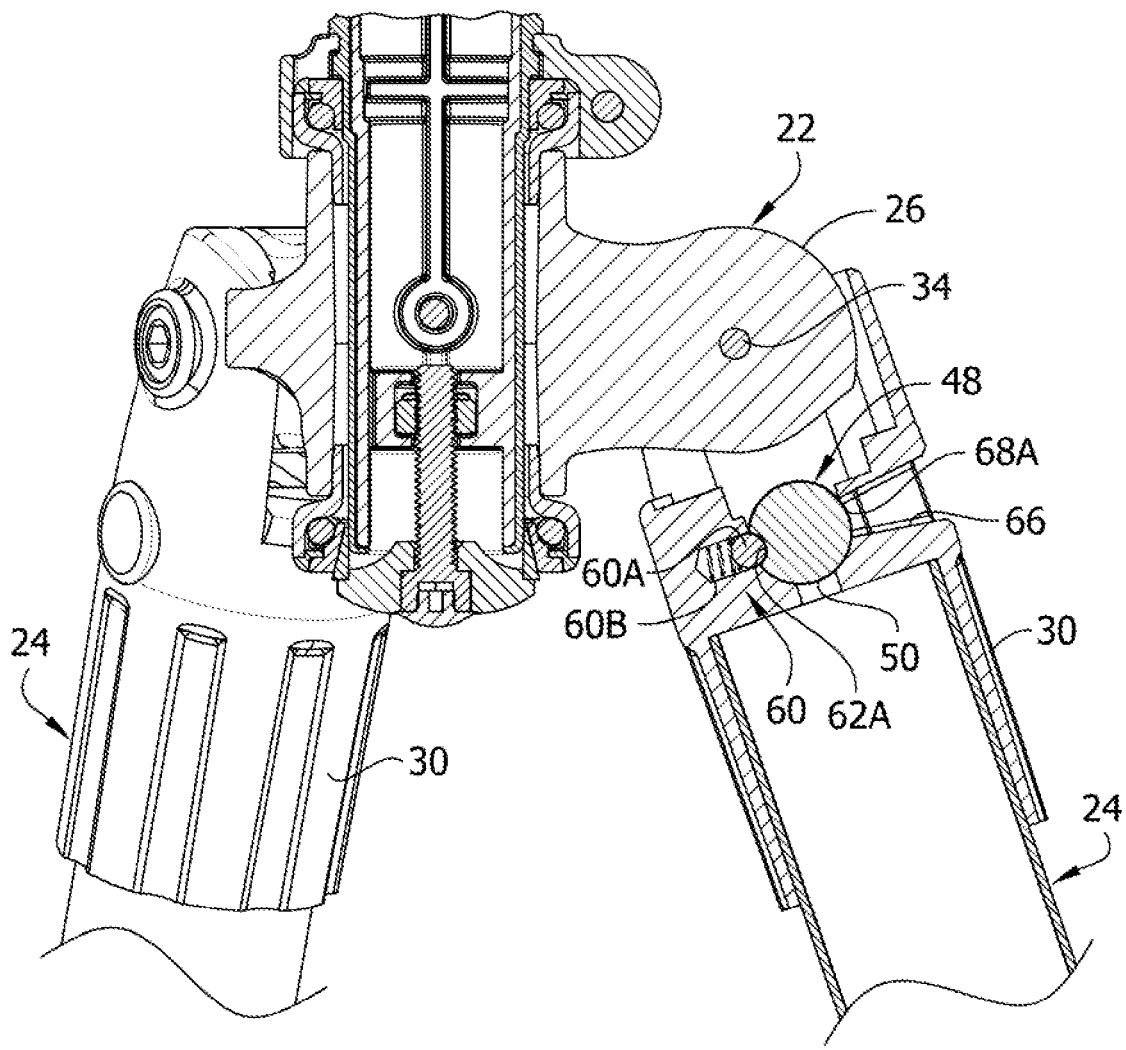
FIG. 6 is a fragmentary section of the multi-legged support taken in a plane including line 6-6 of FIG. 3.
Figure 7:
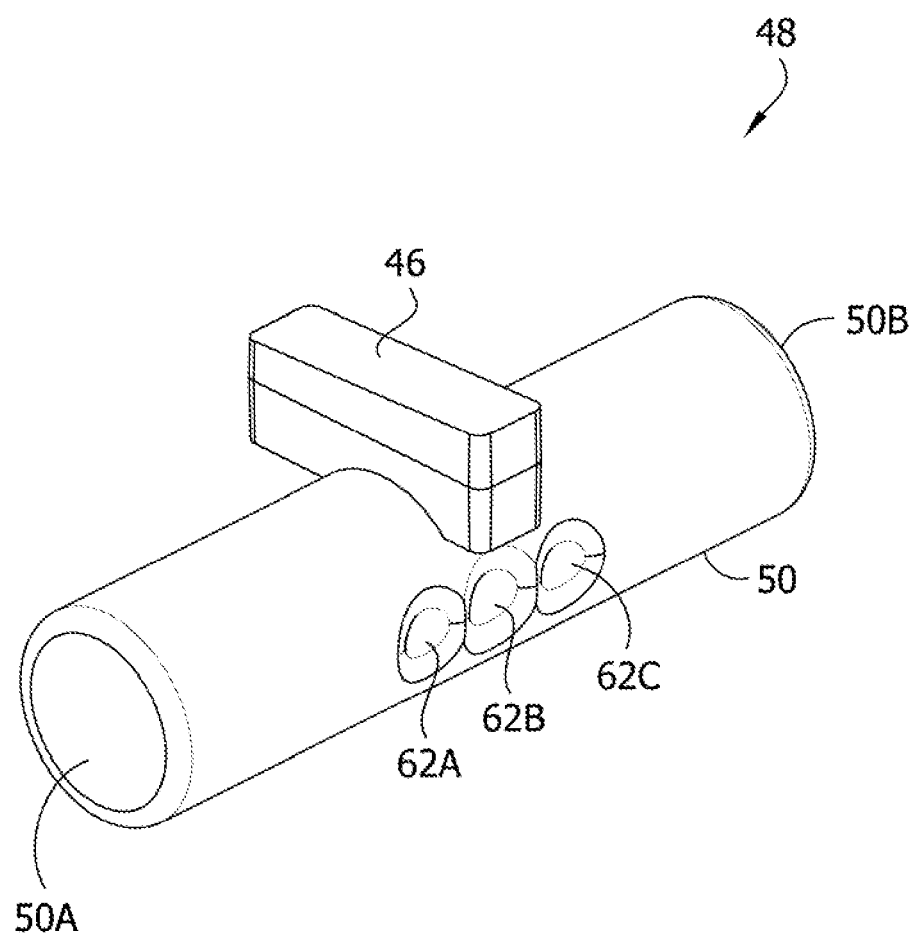
FIG. 7 is a perspective of a leg angle adjuster of the multi-legged support.

Referring to FIGS. 4, 5, and 7, the adjusters 48 comprise slides 50 (broadly, "actuators") slidably received in tracks in the leg heads 30. Each slide 50 has opposing press surfaces 50A, 50B on opposite ends of the slide that are exposed outside the leg head 30 for being pressed by a finger of a user for moving the slide in opposite first and second directions transverse to a longitudinal axis of the leg. The stop 46 is connected to an upper side of the slide 50 and moves conjointly with the slide. The stop 46 is carried by an intermediate portion of the slide 50 housed in the head 30. The stop 46 has an upper stop surface arranged to engage a selected one of the blockers 40, 42, 44 (whichever blocker is in registration with the stop) to stop pivoting of the leg. The arrangement is such that a user can press on one of the opposing press surfaces 50A, 50B to slide the slide in one of the opposite first or second directions (e.g., left or right) to arrange the stop 46 in registration with a selected one of the blockers 40, 42, 44 to select a desired preset operational position of the leg. When the slide is in the desired preset location, the leg is pivoted outward, and pivoting of the leg is stopped by engagement of the stop 46 with the blocker in registration with the stop.

The frame 12 includes retaining structure configured to retain the adjusters 48 in position. In the illustrated embodiment, the retaining structure comprises detents 60 for each of the legs 24. Each detent comprises a ball 60A biased by a spring 60B in an opening in the leg head 30. The retaining structure further comprises recesses 62A-62C in the slide 50 configured to receive the ball 60A. Each recess 62A-62C corresponds to a position of the slide 50 corresponding to a different preset operational pivoted position of the leg 24. A first recess 62A corresponds to the first preset operational pivoted position such that when the ball 60A is received in the first recess the stop 46 is in registration with the first blocker 40 for engaging the first blocker. A second recess 62B corresponds to the second preset operational pivoted position such that when the ball 60A is received in the second recess the stop 46 is in registration with the second blocker 42 for engaging the second blocker. A third recess 62C corresponds to the third preset operational pivoted position such that when the ball 60A is received in the third recess the stop 46 is in registration with the third blocker 44 for engaging the third blocker. The arrangement is such that the ball 60A is displaced from the retaining position (out of any one of the recesses 62A-62C) to permit movement of the actuator 50 in the first or second direction responsive to force on the actuator tending to move the actuator in the respective first or second direction. When the ball 60A moves into registration with the next recess 62A-62C, the ball is resiliently pushed into the recess by the spring 60B. The detent 60 and/or associated recesses 62A-62C can collectively be referred to as a retainer for maintaining an actuator in one or more of the preset locations.

It will be appreciated that when the adjusters 48 are in the preset locations for selecting a preset operational pivoted leg position, the adjusters are free of spring bias tending to bias the adjusters in either the first direction or the second direction. Desirably, when the adjusters 48 are in the preset locations, the adjusters are maintained in such locations notwithstanding whether the stops 46 are in engagement with one of the blockers 40, 42, 44. However, other arrangements can be used without departing form the scope of the present disclosure.

The head 30 of each leg 24 defines a window 66 (broadly, "opening") through which the adjuster 48 and in particular indicators 68A-68C on the slide 50 are visible for showing the user what preset operational pivoted position of the leg has been selected based on the current position of the slide. The window 66 can also be broadly referred to as a reference with respect to which a user references a position of the indicator 68A-68C corresponding to the preset operational position in the particular position of the slide 50. Referring to FIGS. 4 and 5, the indicators 68A-68C are provided on the slide 50 to indicate to the user the preset operational pivoted position of the leg 24 based on which indicator is exposed or viewable through the window 66. In the illustrated embodiment, the indicators 68A-68C comprise numbers (20, 45, 85) corresponding to the degrees the leg 24 is pivotable away from the storage axis SA when the leg is pivoted to the preset operational position. When the slide 50 is in a preset location, the corresponding indicator 68A-68C is visible in the window 66, and the other indicators are hidden from view (inside the head 30). Other types of indicators (e.g., icons, labels, colors, etc.) can be used without departing from the scope of the present disclosure.

In use, by reference to the indicators 68A-68C on the adjusters 48, the user can slide the adjusters of the three legs 24 to select a desired preset operational pivoted position of each leg (which can be the same or different among the legs) and then pivot the legs outwardly until further pivoting movement is prevented by engagement of the stops 46 with the blockers 40, 42, 44 in registration with the stops defining the selected operational positions for each leg.

It will be apparent that modifications and variations are possible without departing from the scope of the invention defined in the appended claims. For example, the locations of the stops 46 and the blockers 40, 42, 44 on the legs and hub can be swapped, such that the stops are provided on the hub and the blockers on the legs. Moreover, the blockers may be movable with respect to a fixed stop, rather than the stop being movable with respect to the blockers. Moreover, the locations of the detents 60 and the recesses 62A-62C on the leg heads 30 and actuators 50 can be swapped, such that the detents are provided on the leg heads and the recesses on the actuators. Other types, arrangements, numbers, and/or configurations of legs, hubs, actuators, retaining structure, and leg angle stop structure can be used without departing from the scope of the present disclosure.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A multi-legged equipment support comprising:
    a hub;
    a set of legs including at least first and second legs, each leg of the set of legs including a head, each head being pivotably connected to the hub for pivoting about a respective pivot axis, each leg being pivotable with respect to the hub about the respective pivot axis outward from a stowed position to at least one operational pivoted position; and
    leg angle stop structure including a first stop and a corresponding first set of blockers, at least one of the first leg or the hub including the first stop, the other of the at least one of the first leg or the hub including the first set of blockers, the first set of blockers comprising a first first leg blocker and a second first leg blocker, at least one of the first stop or the first set of blockers being movable with respect to the hub along an axis parallel to the pivot axis of the first leg to selectively arrange the first stop in registration with at least one of the first first leg blocker or second first leg blocker, the first first leg blocker arranged to engage the first stop when the first stop is in registration with the first first leg blocker to stop outward pivoting of the first leg at a first preset operational pivoted positon of the first leg, the second first leg blocker arranged to engage the first stop when the first stop is in registration with the second first leg blocker to stop outward pivoting of the first leg at a second preset operational pivoted position of the first leg, the first leg being pivotable outward a greater degree from the stowed position to the second preset operational pivoted position than from the stowed position to the first preset operational pivoted position.

2. A multi-legged equipment support as set forth in claim 1, further comprising a first actuator, the first actuator being movable to preset locations to move the at least one of the first stop or the first set of blockers to selectively arrange the first stop with respect to the first set of blockers, a first preset location of the first actuator corresponding to the first stop being in registration with the first first leg blocker, and a second preset location of the actuator corresponding to the first stop being in registration with the second first leg blocker.

3. A multi-legged equipment support as set forth in claim 2, further comprising a retainer arranged to maintain the first actuator in at least one of the first preset location or the second preset location irrespective of engagement of the first stop with the first set of blockers.

4. A multi-legged equipment support as set forth in claim 3, wherein the retainer is arranged to maintain the first actuator in the first preset location and the second preset location.

5. A multi-legged equipment support as set forth in claim 3, wherein the retainer comprises a detent.

6. A multi-legged equipment support as set forth in claim 5, wherein the detent is biased toward a retaining position.

7. A multi-legged equipment support as set forth in claim 6, wherein the first actuator is movable in a first direction to change registration of the stop with the first first leg blocker to registration of the stop with the second first leg blocker, and movable in a second direction opposite the first direction to change registration of the stop with the second first leg blocker to registration of the stop with the first first leg blocker.

8. A multi-legged equipment support as set forth in claim 7, wherein the detent is arranged to be displaced from the retaining position to permit movement of the first actuator in the first direction responsive to force on the actuator tending to move the actuator in the first direction.

9. A multi-legged equipment support as set forth in claim 8, wherein the first actuator includes a first end portion and a second end portion opposite the first end portion, the first and second end portions being located to be pushed by a finger of a user to move the first actuator between the first and second preset locations.

10. A multi-legged equipment support as set forth in claim 9, wherein the first actuator comprises a slide, the slide having an intermediate portion housed in the head of the first leg, the first and second end portions being exposed outside the head of the first leg.

11. A multi-legged equipment support as set forth in claim 10, wherein the actuator comprises a first indicator, the first indicator corresponding to the first preset location of the first actuator, the first indicator being arranged to be exposed for view by a user when the first actuator is in the first preset location and to be hidden from view by the user when the first actuator is not in the first preset location.

12. A multi-legged equipment support as set forth in claim 11, wherein the actuator comprises a second indicator, the second indicator corresponding to the second preset location of the first indicator, the second indicator being arranged to be exposed for view by the user when the first actuator is in the second preset location and to be hidden from view by the user when the first actuator is not in the second preset location.

13. A multi-legged equipment support as set forth in claim 12,
further comprising an opening in at least one of the hub or the head of the first leg, the first indicator being exposed at the opening when the first actuator is in the first preset location, and the second indicator being exposed at the opening when the first actuator is in the second preset location.

14. A multi-legged equipment support as set forth in claim 2, wherein the actuator comprises a first indicator, the first indicator corresponding to the first preset location of the first actuator, the first indicator being arranged to be exposed for view by a user when the first actuator is in the first preset location and to be hidden from view by the user when the first actuator is not in the first preset location.

15. A multi-legged equipment support as set forth in claim 2, wherein the actuator comprises a first indicator, the first indicator corresponding to the first preset location of the first actuator, the first indicator being arranged to be exposed for view by a user when the first actuator is in the first preset location.

16. A multi-legged equipment support as set forth in claim 15, wherein actuator comprises a wall and the indictor is provided on the wall.

17. A multi-legged equipment support as set forth in claim 15, wherein the leg comprises a reference, the reference being located with respect to the indicator such that when the indicator is in registration with the reference, the reference indicates that the indicator is in the first preset location or the second preset location.

18. A multi-legged equipment support as set forth in claim 1, wherein the first set of blockers comprises a third first leg blocker, the first stop being movable with respect to the first set of blockers to selectively arrange the first stop in registration with the third first leg blocker, the third first leg blocker arranged to engage the first stop when the first stop is in registration with the third first leg blocker to stop outward pivoting of the first leg at a third preset operational pivoted position of the first leg, the first leg being pivotable outward a greater degree from the stowed position to the third preset operational position than from the stowed position to the second preset operational pivoted position.

19. A multi-legged equipment support as set forth in claim 1, wherein the first leg includes the first stop, and the hub includes the first set of blockers, the stop being movable with respect to the head of the leg to selectively arrange the first stop with respect to the set of blockers.

20. A multi-legged equipment support as set forth in claim 1, wherein the leg angle stop structure includes a second stop and a corresponding second set of blockers, at least one of the second leg or the hub including the second stop, the other of the at least one of the second leg or the hub including the second set of blockers, the second set of blockers comprising a first second leg blocker and a second second leg blocker, at least one of the second stop or the second set of blockers being movable with respect to the hub to selectively arrange the second stop in registration with at least one of the first second leg blocker and second second leg blocker, the first second leg blocker arranged to engage the second stop when the second stop is in registration with the first second leg blocker to stop outward pivoting of the second leg at a first preset operational pivoted positon of the second leg, the second second leg blocker arranged to engage the second stop when the second stop is in registration with the second second leg blocker to stop outward pivoting of the second leg at a second preset operational pivoted position of the second leg, the second leg being pivotable outward a greater degree from the stowed position to the second preset operational pivoted position than from the stowed position to the first preset operational pivoted position.

21. A multi-legged equipment support as set forth in claim 1, further comprising retaining structure configured to engage the at least one of the moveable first stop or first set of blockers to locate the at least one of the moveable first stop or first set of blockers in a preset location to engage the other of the first stop or first set of blockers for locating the leg in the first operational pivoted position.

22. A multi-legged equipment support comprising:
a hub;
a set of legs including at least first and second legs, each leg of the set of legs including a head, each head being pivotably connected to the hub for pivoting about a respective pivot axis, each leg being pivotable with respect to the hub about the respective pivot axis outward from a stowed position to at least one operational pivoted position; and
leg angle stop structure including a first stop and a corresponding first set of blockers, at least one of the first leg or the hub including the first stop, the other of the at least one of the first leg or the hub including the first set of blockers, the first set of blockers comprising a first first leg blocker and a second first leg blocker, at least one of the first stop or the first set of blockers being movable with respect to the hub to selectively arrange the first stop in registration with at least one of the first first leg blocker or second first leg blocker, the first first leg blocker arranged to engage the first stop when the first stop is in registration with the first first leg blocker to stop outward pivoting of the first leg at a first preset operational pivoted positon of the first leg, the second first leg blocker arranged to engage the first stop when the first stop is in registration with the second first leg blocker to stop outward pivoting of the first leg at a second preset operational pivoted position of the first leg, the first leg being pivotable outward a greater degree from the stowed position to the second preset operational pivoted position than from the stowed position to the first preset operational pivoted position;
a first actuator, the first actuator being movable to preset locations to move the at least one of the first stop or the first set of blockers to selectively arrange the first stop with respect to the first set of blockers, a first preset location of the first actuator corresponding to the first stop being in registration with the first first leg blocker, and a second preset location of the actuator corresponding to the first stop being in registration with the second first leg blocker;
wherein the actuator is movable in a first direction from the first preset location to the second preset location and movable in a second direction opposite the first direction from the second preset location to the first preset location, the actuator being free of a bias biasing the actuator in the first direction and free of a bias biasing the actuator in the second direction.

23. A multi-legged equipment support comprising:
a hub;
a set of legs including at least first and second legs, each leg of the set of legs including a head, each head being pivotably connected to the hub for pivoting about a respective pivot axis, at least the first leg being pivotable with respect to the hub about the respective pivot axis outward from a stowed position to at least first and second preset operational pivoted positions;

a first actuator associated with the first leg, the first actuator being movable with respect to the head of the first leg between first and second preset locations, the first leg being pivotable outward from the stowed position to the first preset operational pivoted position when the first actuator is in the first preset location, the first leg being pivotable outward from the stowed position to a second preset operational pivoted position different from the first preset operational pivoted position when the first actuator is in the second preset location; and a retainer arranged to maintain the first actuator in at least one of the first preset location or the second preset location irrespective of the first leg being in the first or second operational pivoted positions.

24. A multi-legged equipment support as set forth in claim 23, further comprising:

a second actuator associated with the second leg, the second actuator being movable between first and second preset locations with respect to the head of the second leg, the second leg being pivotable outward from the stowed position to the first preset operational pivoted position when the second actuator is in the first preset location, the second leg being pivotable outward from the stowed position to a second preset operational pivoted position different from the first preset operational pivoted position when the second actuator is in the second preset location; and a second retainer arranged to maintain the second actuator in at least one of the first preset location or the second preset location irrespective of the second leg being in the first or second operational pivoted positions.

\* \* \* \* \*